United States Patent
Moriyama et al.

(10) Patent No.: US 12,523,259 B2
(45) Date of Patent: Jan. 13, 2026

(54) STEERING SHAFT AND STEERING-SHAFT MANUFACTURING METHOD

(71) Applicant: NSK Ltd., Tokyo (JP)

(72) Inventors: Seiichi Moriyama, Gunma (JP); Tetsuya Kanou, Gunma (JP)

(73) Assignee: NSK LTD., Tokyo (JP)

( * ) Notice: Subject to any disclaimer, the term of this patent is extended or adjusted under 35 U.S.C. 154(b) by 420 days.

(21) Appl. No.: 18/021,454

(22) PCT Filed: Sep. 1, 2021

(86) PCT No.: PCT/JP2021/032109
§ 371 (c)(1),
(2) Date: Feb. 15, 2023

(87) PCT Pub. No.: WO2022/050306
PCT Pub. Date: Mar. 10, 2022

(65) Prior Publication Data
US 2023/0341002 A1 Oct. 26, 2023

(30) Foreign Application Priority Data
Sep. 2, 2020 (JP) .................. 2020-147264

(51) Int. Cl.
*F16D 1/10* (2006.01)
*B62D 1/20* (2006.01)
(Continued)

(52) U.S. Cl.
CPC .................. *F16D 1/10* (2013.01); *B62D 1/20* (2013.01); *F16D 3/06* (2013.01); *F16C 3/03* (2013.01);
(Continued)

(58) Field of Classification Search
CPC ..... B29C 43/16; B29C 43/18; B29L 2031/75; B62D 1/16; B62D 1/185; B62D 1/20;
(Continued)

(56) References Cited

U.S. PATENT DOCUMENTS 6,705,946 B2* 3/2004 Bridges ............... F16D 1/10
403/359.1
7,172,361 B2* 2/2007 Minamoto ............ F16C 3/03
464/182
(Continued)

FOREIGN PATENT DOCUMENTS

CN 1815059 A 8/2006
EP 1704938 A1 9/2006
(Continued)

OTHER PUBLICATIONS

International Search Report of PCT/JP2021/032109 dated Nov. 16, 2021 [PCT/ISA/210].
(Continued)

*Primary Examiner* — Josh Skroupa
(74) *Attorney, Agent, or Firm* — Sughrue Mion, PLLC

(57) ABSTRACT

A steering shaft includes an inner shaft including first tooth parts, an outer shaft including second tooth parts, and a resin layer. The resin layer includes a plurality of thick film parts and at least four thin film parts. Each thick film part is disposed with a gap from one of the second tooth parts, and each thin film part contacts both one of the first tooth parts and one of the second tooth parts. At a section orthogonal to a central axis of the inner shaft, the thickness of each thin film part is smaller than the thickness of each thick film part.

10 Claims, 17 Drawing Sheets

(51) Int. Cl.
*F16C 3/03* (2006.01)
*F16D 3/06* (2006.01)

(52) U.S. Cl.
CPC ...... *F16C 2223/30* (2013.01); *F16C 2240/60* (2013.01); *F16D 2001/103* (2013.01); *Y10T 403/7035* (2015.01)

(58) Field of Classification Search
CPC ........ F16C 3/026; F16C 3/03; F16C 2223/30; F16C 2240/60; F16C 2326/24; F16D 1/10; F16D 3/06; F16D 2001/102; F16D 2001/103; F16D 2250/0023; F16D 2250/0038; F16D 2250/0046; Y10T 403/7026; Y10T 403/7028; Y10T 403/7031; Y10T 403/7032; Y10T 403/7033; Y10T 403/7035
USPC ......... 403/359.1, 359.2, 359.3, 359.4, 359.5, 403/359.6; 464/75, 162, 180, 183
See application file for complete search history.

(56) References Cited

U.S. PATENT DOCUMENTS

| | | | | |
|---|---|---|---|---|
| 8,230,710 | B2* | 7/2012 | Brissette | F16C 3/03 72/46 |
| 8,753,215 | B2* | 6/2014 | Tokioka | F16D 3/06 464/162 |
| 9,422,986 | B2* | 8/2016 | Kurokawa | F16D 3/06 |
| 9,446,782 | B2* | 9/2016 | Kurokawa | F16C 3/03 |
| 9,770,947 | B1* | 9/2017 | Piorkowski | B60B 35/14 |
| 9,771,969 | B2* | 9/2017 | Tokioka | F16C 3/03 |
| 9,885,390 | B2* | 2/2018 | Nishida | F16D 3/06 |
| 9,915,291 | B2 | 3/2018 | Kurokawa | |
| 10,054,167 | B2* | 8/2018 | Piorkowski | F16D 3/68 |
| 2006/0201271 | A1 | 9/2006 | Masui | |
| 2009/0245935 | A1* | 10/2009 | Kamikawa | F16D 1/072 403/359.1 |

FOREIGN PATENT DOCUMENTS

| | | | |
|---|---|---|---|
| EP | 2281731 A2 | 2/2011 | |
| EP | 2282071 A2 | 2/2011 | |
| JP | 5-157119 A | 6/1993 | |
| JP | 2008-002630 A | 1/2008 | |
| JP | 5549658 B2 * | 7/2014 | ............... F16D 3/06 |
| JP | 2017-025964 A | 2/2017 | |
| JP | 2017-145945 A | 8/2017 | |
| JP | 2019-084859 A | 6/2019 | |
| WO | 2015/015952 A1 | 2/2015 | |

OTHER PUBLICATIONS

Chinese Office Action dated Jul. 16, 2025, issued in Chinese application No. 202180053694.3.

* cited by examiner

STEERING SHAFT AND STEERING-SHAFT MANUFACTURING METHOD

CROSS REFERENCE TO RELATED APPLICATIONS

This application is a National Stage of International Application No. PCT/JP2021/032109, filed Sep. 1, 2021, claiming priority to Japanese Patent Application No. 2020-147264, filed Sep. 2, 2020.

FIELD

The present disclosure relates to a steering shaft and a steering-shaft manufacturing method.

BACKGROUND

In a vehicle, a steering device is provided as a device for transferring an operation of the steering wheel by an operator (driver) to the wheels (for example, refer to Patent Literature 1). The steering device includes a steering shaft that transfers rotational torque. The steering shaft includes an inner shaft including a plurality of first tooth parts on the outer periphery of the inner shaft, an outer shaft including a plurality of second tooth parts on the inner periphery of the outer shaft, and a resin layer provided on the outer peripheral surface of each first tooth part. The thickness of a resin layer part provided on the tooth surface (side surface) of each first tooth part in the circumferential direction is substantially equal among the first tooth parts.

CITATION LIST

Patent Literature

Patent Literature 1: Japanese Patent Application Laid-open No. 2017-145945

SUMMARY

Technical Problem

Resin has a linear expansion coefficient higher than that of metal. Thus, at high temperature in the steering shaft disclosed in Patent Literature 1, the resin layer part provided on the tooth surface of each first tooth part expands and contacts both the tooth surface of the first tooth part and the tooth surface of the corresponding second tooth part. Thereafter, the resin layer part contracts when the steering shaft returns to room temperature. Thus, a gap is generated between the resin layer part provided on the tooth surfaces of all first tooth parts and the tooth surface of each second tooth part, and accordingly, backlash becomes large and rattle sound is potentially generated during vehicle traveling.

The present disclosure is made in view of the above-described problem and intended to provide a steering shaft capable of further reducing rattle sound generated during vehicle traveling and a method of manufacturing the steering shaft.

Solution to Problem

To achieve the above object, a steering shaft according to an embodiment of the present disclosure comprising: an inner shaft including a plurality of first tooth parts arranged in a circumferential direction on an outer peripheral surface of the inner shaft; an outer shaft including a plurality of second tooth parts and disposed on an outer peripheral side of the first tooth part, the second tooth parts being arranged in the circumferential direction on an inner peripheral surface of the outer shaft; and a resin layer disposed between the plurality of first tooth parts and the plurality of second tooth parts, wherein the resin layer includes a plurality of thick film parts and at least four thin film parts, each of the thick film parts is disposed between a tooth surface of one of the first tooth parts and a tooth surface of one of the second tooth parts with a gap from one of the first tooth part and the second tooth part, each of the thin film parts is disposed between a tooth surface of one of the first tooth parts and a tooth surface of one of the second tooth parts and contacts both the first tooth part and the second tooth part, and at a section orthogonal to a central axis of the inner shaft and including a first virtual line, a second virtual line, and a third virtual line, the thickness of each of the thin film parts along the third virtual line is smaller than the thickness of each of the thick film parts along the third virtual line, the first virtual line extending in the circumferential direction through an outer peripheral end of each of the first tooth parts, the second virtual line extending in the circumferential direction through an inner peripheral end of each of the second tooth parts, the third virtual line extending in the circumferential direction through the middle of the first virtual line and the second virtual line in a radial direction. The inner shaft and the outer shaft of the present disclosure can be employed for any of spline fitting and serration fitting.

In this manner, each of the thin film parts is disposed between the tooth surface of one of the first tooth parts and the tooth surface of one of the second tooth parts and contacts both the first tooth part and the second tooth part. Specifically, the tooth surface of each first tooth part, the tooth surface of the corresponding second tooth part, and the corresponding thin film part therebetween that are adjacent to one another in the circumferential direction contact without a gap, and at least four of the thin film parts are provided. In a high-temperature environment, the resin layer expands in the circumferential direction and contacts the tooth surface of each first tooth part and the tooth surface of each second tooth part without a gap. Simultaneously, the resin layer presses the tooth surface of each first tooth part and the tooth surface of each second tooth part in the circumferential direction in some cases. Since the thickness of each thin film part in the circumferential direction is smaller than that of each thick film part, the expansion amount of each thin film part is smaller than that of each thick film part and resin of the thin film parts is less likely to move outward in the radial direction than each thick film part. Accordingly, a gap is unlikely to be generated around the thin film parts in a room-temperature environment after a high-temperature environment. Thus, in the steering shaft of the present disclosure, backlash in a room-temperature environment after a high-temperature environment is smaller than in the steering shaft of Patent Literature 1, and rattle sound generated during vehicle traveling can be further reduced.

In a preferable aspect of the steering shaft, a plurality of sets of the thin film parts are disposed at intervals in the circumferential direction, and thus, in the steering shaft of the present disclosure, backlash is smaller than in the steering shaft of Patent Literature 1, and rattle sound generated during vehicle traveling can be further reduced.

In a preferable aspect of the steering shaft, a plurality of sets of the thin film parts are disposed at equally spaced positions in the circumferential direction. In other words, each set of the thin film part is provided at an equally spaced position in the circumferential direction, and thus, in the steering shaft of the present disclosure, backlash is further smaller than in the steering shaft of Patent Literature 1, and rattle sound generated during vehicle traveling can be further reduced. Note that one set of thin film parts means a collection of thin film parts disposed adjacent to each other in the circumferential direction.

In a preferable aspect of the steering shaft, the number of the plurality of sets of the thin film parts is two, and thus backlash of the steering shaft can be reduced with the reduced number of sets of thin film parts, and rattle sound generated during vehicle traveling can be further reduced.

In a preferable aspect of the steering shaft, each set of thin film parts includes four of the thin film parts, and thus backlash of the steering shaft is smaller than with two thin film parts and rattle sound generated during vehicle traveling can be further reduced.

In a preferable aspect of the steering shaft, the inner shaft is a hollow member, and thus the weight of the steering shaft is reduced.

In a preferable aspect of the steering shaft, the plurality of first tooth parts include thick teeth and thin teeth the width of each of which in the circumferential direction is smaller than the width of each of the thick teeth in the circumferential direction, and each of the thin film parts contacts both one of the thick teeth and one of the second tooth parts. In this manner, it is possible to easily form the thin film parts by replacing some of the plurality of first tooth parts with the thick teeth.

In a preferable aspect of the steering shaft, the plurality of second tooth parts include thick teeth and thin teeth the width of each of which in the circumferential direction is smaller than the width of each of the thick teeth in the circumferential direction, and each of the thin film parts contacts both one of the thick teeth and one of the first tooth parts. In this manner, it is possible to easily form the thin film parts by replacing some of the plurality of second tooth parts with the thick teeth.

A steering-shaft manufacturing method according to an embodiment of the present disclosure comprising: a resin layer formation process of forming a resin layer on an inner shaft or an outer shaft, the inner shaft including a plurality of first tooth parts arranged in a circumferential direction on an outer peripheral surface of the inner shaft, the outer shaft including a plurality of second tooth parts and disposed on an outer peripheral side of the first tooth parts of the inner shaft, the second tooth parts being arranged in the circumferential direction on an inner peripheral surface of the outer shaft; a heating process of heating the inner shaft, the outer shaft, and the resin layer in a state in which the resin layer contacts tooth surfaces of all of the first tooth parts and tooth surfaces of all of the second tooth parts; and a cooling process of cooling the inner shaft, the outer shaft, and the resin layer after the heating process, wherein the plurality of first tooth parts include thick teeth and thin teeth the width of each of which in the circumferential direction is smaller than the width of each of the thick teeth in the circumferential direction.

The gap between the tooth surface of each thick tooth among the first tooth parts and the tooth surface of the corresponding second tooth part in the circumferential direction is smaller than the gap between the tooth surface of each thin tooth among the first tooth parts and the tooth surface of the corresponding second tooth part in the circumferential direction. Thus, the resin layer disposed in the gap between each thick tooth and the corresponding second tooth part is a thin film part, and the resin layer disposed in the gap between each thin tooth and the corresponding second tooth part is a thick film part. Part of the thick film parts moves in the circumferential direction in the heating process and solidifies there in the cooling process, and thus a gap is generated between each solidified thick film part and the tooth surface of the corresponding second tooth part. However, since each thin film part contacts the corresponding thick tooth and the corresponding second tooth part in any of the heating process and the cooling process, no gap is generated. In this manner, the thin film parts and the thick film parts of the resin layer can be shaped by relatively easy work.

A steering-shaft manufacturing method according to an embodiment of the present disclosure comprising: a resin layer formation process of forming a resin layer on an inner shaft or an outer shaft, the inner shaft including a plurality of first tooth parts arranged in a circumferential direction on an outer peripheral surface of the inner shaft, the outer shaft including a plurality of second tooth parts and disposed on an outer peripheral side of the first tooth parts of the inner shaft, the second tooth parts being arranged in the circumferential direction on an inner peripheral surface of the outer shaft; a heating process of heating the inner shaft, the outer shaft, and the resin layer in a state in which the resin layer contacts tooth surfaces of all of the first tooth parts and tooth surfaces of all of the second tooth parts; and a cooling process of cooling the inner shaft, the outer shaft, and the resin layer after the heating process, wherein the plurality of second tooth parts include thick teeth and thin teeth the width of each of which in the circumferential direction is smaller than the width of each of the thick teeth in the circumferential direction.

The gap between the tooth surface of each thick tooth among the second tooth parts and the tooth surface of the corresponding first tooth part in the circumferential direction is smaller than the gap between the tooth surface of each thin tooth among the second tooth parts and the tooth surface of the corresponding first tooth part in the circumferential direction. Thus, the resin layer disposed in the gap between each thick tooth and the corresponding first tooth part is a thin film part, and the resin layer disposed in the gap between each thin tooth and the corresponding first tooth part is a thick film part. Part of resin of the thick film parts moves in the circumferential direction in the heating process and solidifies there in the cooling process, and thus a gap is generated between each solidified thick film part and the tooth surface of the corresponding first tooth part. However, since each thin film part contacts the corresponding thick tooth and the corresponding first tooth part in any of the heating process and the cooling process, no gap is generated. In this manner, the thin film parts and the thick film parts of the resin layer can be shaped by relatively easy work.

Advantageous Effects of Invention

According to the present disclosure, it is possible to provide a steering shaft capable of further reducing rattle sound generated during vehicle traveling and a method of manufacturing the steering shaft.

DESCRIPTION OF EMBODIMENTS

Aspects (embodiments) of the present invention will be described below in detail with reference to the accompanying drawings. Contents described below in the embodiments do not limit the present invention. Components described below include those that could be easily thought of by the skilled person in the art and those identical in effect. Components described below may be combined as appropriate.

First Embodiment

Figure 1:
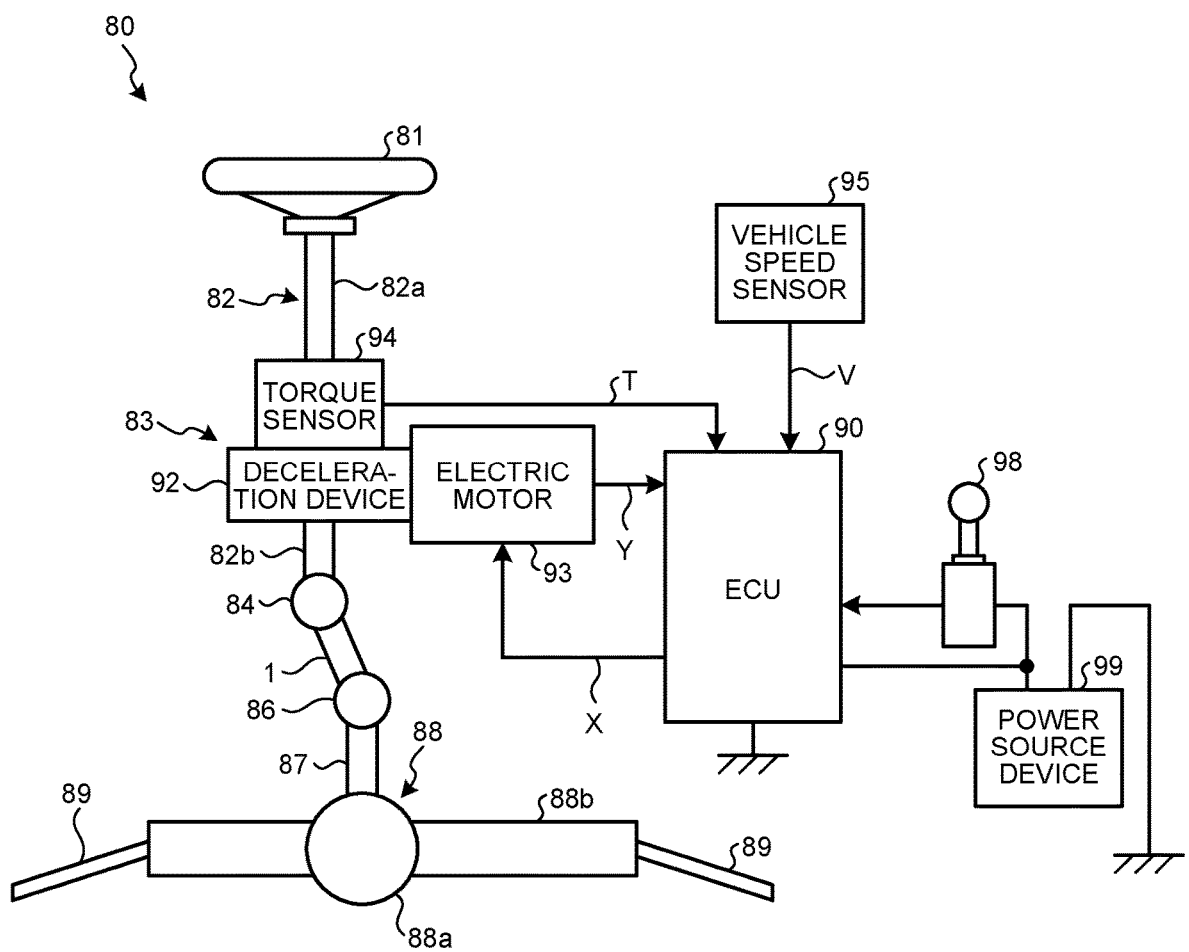
FIG. 1 is a schematic diagram schematically illustrating a steering device according to a first embodiment.
Figure 2:
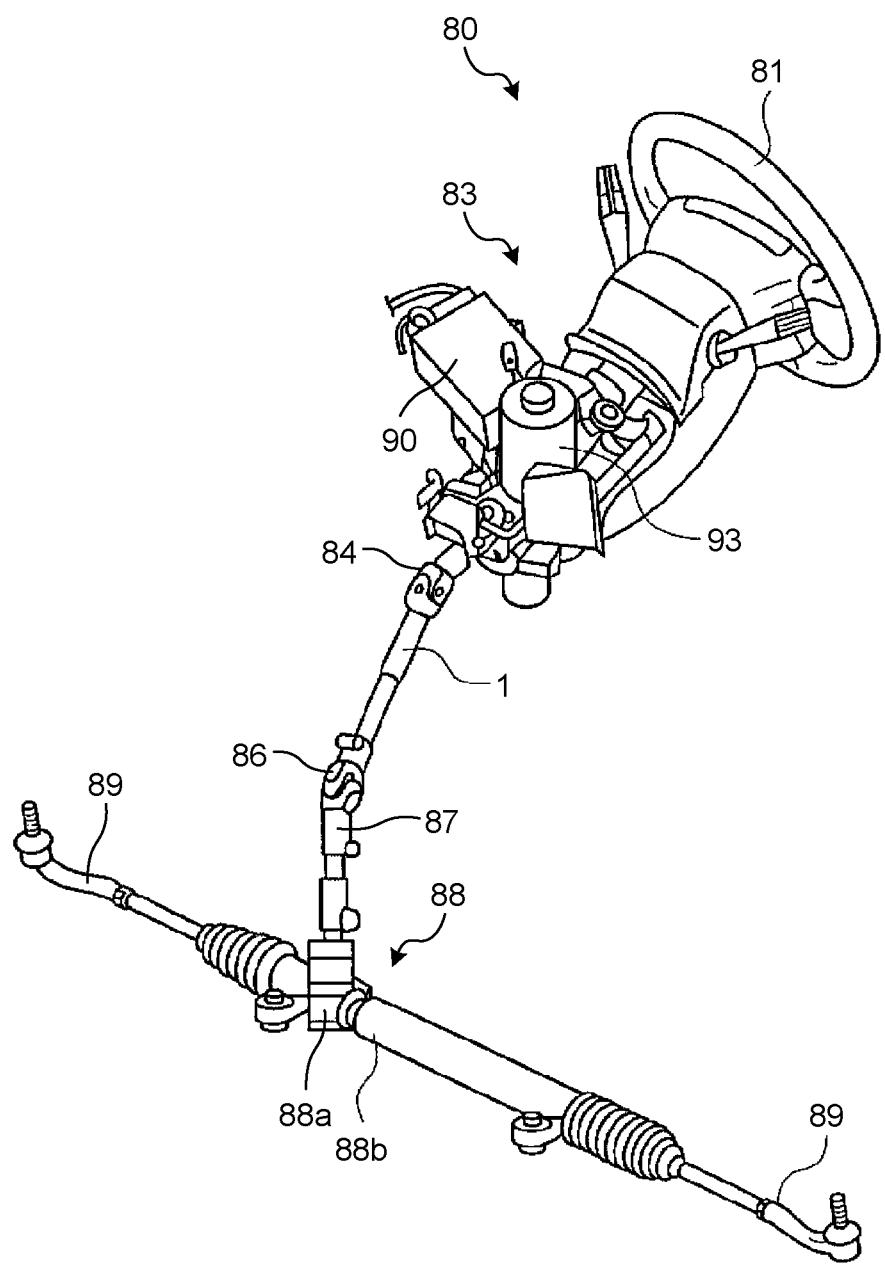
FIG. 2 is a perspective view schematically illustrating the steering device according to the first embodiment.

FIG. 1 is a schematic diagram schematically illustrating a steering device according to a first embodiment. FIG. 2 is a perspective view schematically illustrating the steering device according to the first embodiment.

As illustrated in FIGS. 1 and 2, a steering device 80 includes a steering wheel 81, an upper shaft 82, a steering force assist mechanism 83, a universal joint 84, a lower shaft (steering shaft) 1, and a universal joint 86 in the order of transfer of force provided by an operator and is joined to a pinion shaft 87. The steering device 80 also includes an electronic control unit (ECU) 90 and a torque sensor 94. A vehicle speed sensor 95 is included in a vehicle body and outputs a vehicle speed signal V to the ECU 90 through controller area network (CAN) communication.

The upper shaft 82 includes an input shaft 82a and an output shaft 82b. One end part of the input shaft 82a is coupled to the steering wheel 81, and the other end part of the input shaft 82a is coupled to the output shaft 82b. One end part of the output shaft 82b is coupled to the input shaft 82a, and the other end part of the output shaft 82b is coupled to the universal joint 84. In the present embodiment, the input shaft 82a and the output shaft 82b are formed of a typical steel material such as a carbon steel for machine structural use (SC material) or a carbon steel tube for machine structural purposes (STKM material).

The lower shaft (steering shaft) 1 is a member coupled to the output shaft 82b through the universal joint 84. One end part of the lower shaft 1 is coupled to the universal joint 84, and the other end part thereof is coupled to the universal joint 86. One end part of the pinion shaft 87 is coupled to the universal joint 86, and the other end part of the pinion shaft 87 is coupled to a steering gear 88.

The steering gear 88 includes a pinion 88a and a rack 88b. The pinion 88a is coupled to the pinion shaft 87. The rack 88b meshes with the pinion 88a. The steering gear 88 converts rotational motion transferred to the pinion 88a into linear motion through the rack 88b. The rack 88b is coupled to a tie rod 89. In other words, the steering device 80 is of a rack-and-pinion scheme.

The steering force assist mechanism 83 includes a deceleration device 92 and an electric motor 93. The electric motor 93 is, for example, a brushless motor but may be a motor including a brush (wiper) and a commutator. The deceleration device 92 is, for example, a worm deceleration device. Torque generated at the electric motor 93 is transferred to a worm wheel through a worm inside the deceleration device 92 and rotates the worm wheel. With the worm and the worm wheel, the deceleration device 92 increases the torque generated at the electric motor 93. Then, the deceleration device 92 provides steering assist torque to the output shaft 82b. In other words, the steering device 80 is of a column assist scheme.

The torque sensor 94 detects, as steering torque, steering force provided by the operator and transferred to the input shaft 82a through the steering wheel 81. The vehicle speed sensor 95 detects the traveling speed (vehicle speed) of the vehicle body on which the steering device 80 is mounted. The electric motor 93, the torque sensor 94, and the vehicle speed sensor 95 are electrically connected to the ECU 90.

The ECU 90 controls operation of the electric motor 93. In addition, the ECU 90 acquires a signal from each of the torque sensor 94 and the vehicle speed sensor 95. Specifically, the ECU 90 acquires steering torque T from the torque sensor 94 and acquires the vehicle speed signal V of the vehicle body from the vehicle speed sensor 95. The ECU 90 is supplied with electric power from a power source device (for example, an on-board battery) 99 while an ignition switch 98 is on. The ECU 90 calculates a steering assist command value of an assist command based on the steering torque T and the vehicle speed signal V. Then, the ECU 90 adjusts an electric power value X supplied to the electric motor 93 based on the calculated steering assist command value. The ECU 90 acquires, as operation information Y, induction voltage information from the electric motor 93 or information output from a resolver or the like provided at the electric motor 93.

Steering force input to the steering wheel 81 by the operator (driver) is transferred to the deceleration device 92 of the steering force assist mechanism 83 through the input shaft 82a. Accordingly, the ECU 90 acquires, from the torque sensor 94, the steering torque T input to the input shaft 82a and acquires the vehicle speed signal V from the vehicle speed sensor 95. Then, the ECU 90 controls operation of the electric motor 93. Steering assist torque generated by the electric motor 93 is transferred to the deceleration device 92.

Steering torque (including the steering assist torque) output through the output shaft 82b is transferred to the lower shaft (steering shaft) 1 through the universal joint 84 and further transferred to the pinion shaft 87 through the universal joint 86. The steering force transferred to the pinion shaft 87 is transferred to the tie rod 89 through the steering gear 88 and displaces wheels.

Figure 3:
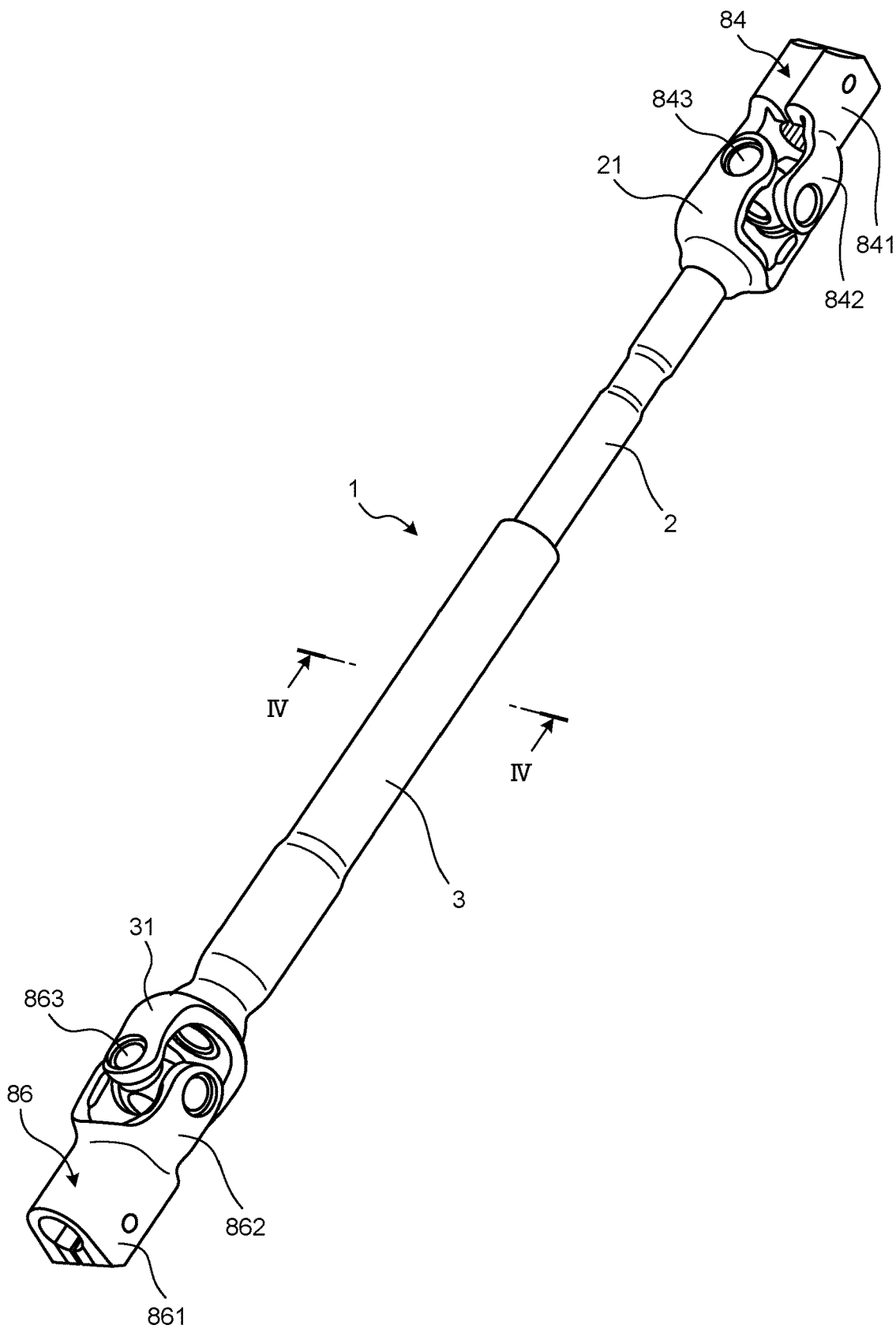
FIG. 3 is a side view illustrating a lower shaft and universal joints in FIG. 2.

FIG. 3 is a perspective view illustrating the lower shaft and the universal joints in FIG. 2. As illustrated in FIG. 3, the lower shaft (steering shaft) 1 includes an inner shaft 2, an outer shaft 3, a resin layer 4 (refer to FIG. 4), and the universal joints 84 and 86. The universal joints 84 and 86 are connected to end parts of the lower shaft 1. The inner shaft 2 and the outer shaft 3 extend in the axial direction of a central axis Ax.

The universal joint 84 is connected to an end part of the inner shaft 2. The universal joint 84 includes a base part 841 and a yoke part 842. The yoke part 842 is bifurcated into two parts, and through-holes are provided at the respective parts. Through-holes are also provided at a yoke part 21 of the inner shaft 2. A spider 843 is fitted into these through-holes when the universal joint 84 is connected to the inner shaft 2.

The universal joint 86 is connected to an end part of the outer shaft 3. The universal joint 86 includes a base part 861 and a yoke part 862. The yoke part 862 is bifurcated into two parts, and through-holes are provided at the respective parts. Through-holes are also provided at a yoke part 31 of the outer shaft 3. A spider 863 is fitted into these through-holes when the universal joint 86 is connected to the outer shaft 3.

Figure 4:
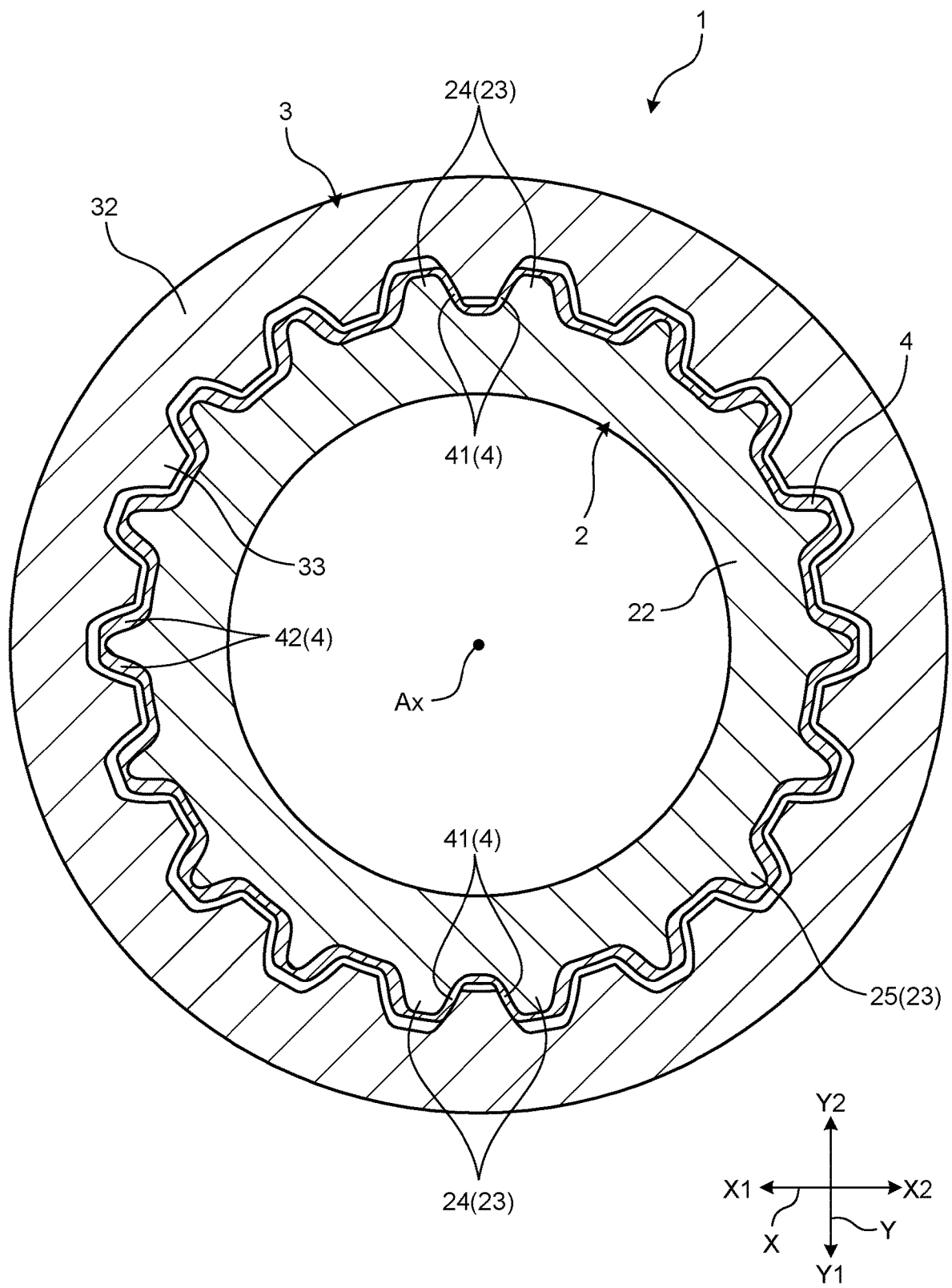
FIG. 4 is a schematic diagram illustrating a section taken along line IV-IV in FIG. 3.
Figure 5:
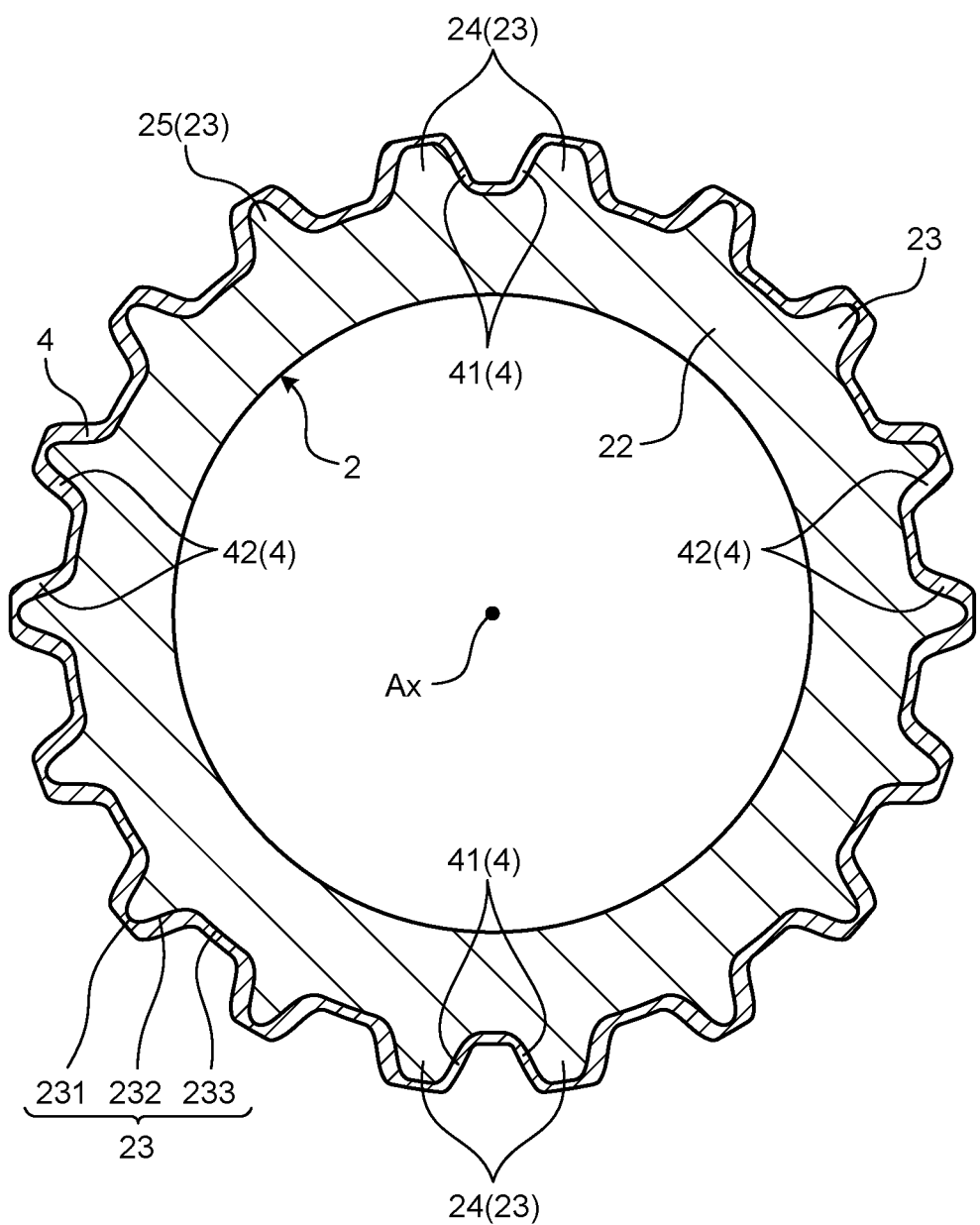
FIG. 5 is a schematic diagram illustrating a section of an inner shaft and a resin layer in FIG. 4.
Figure 6:
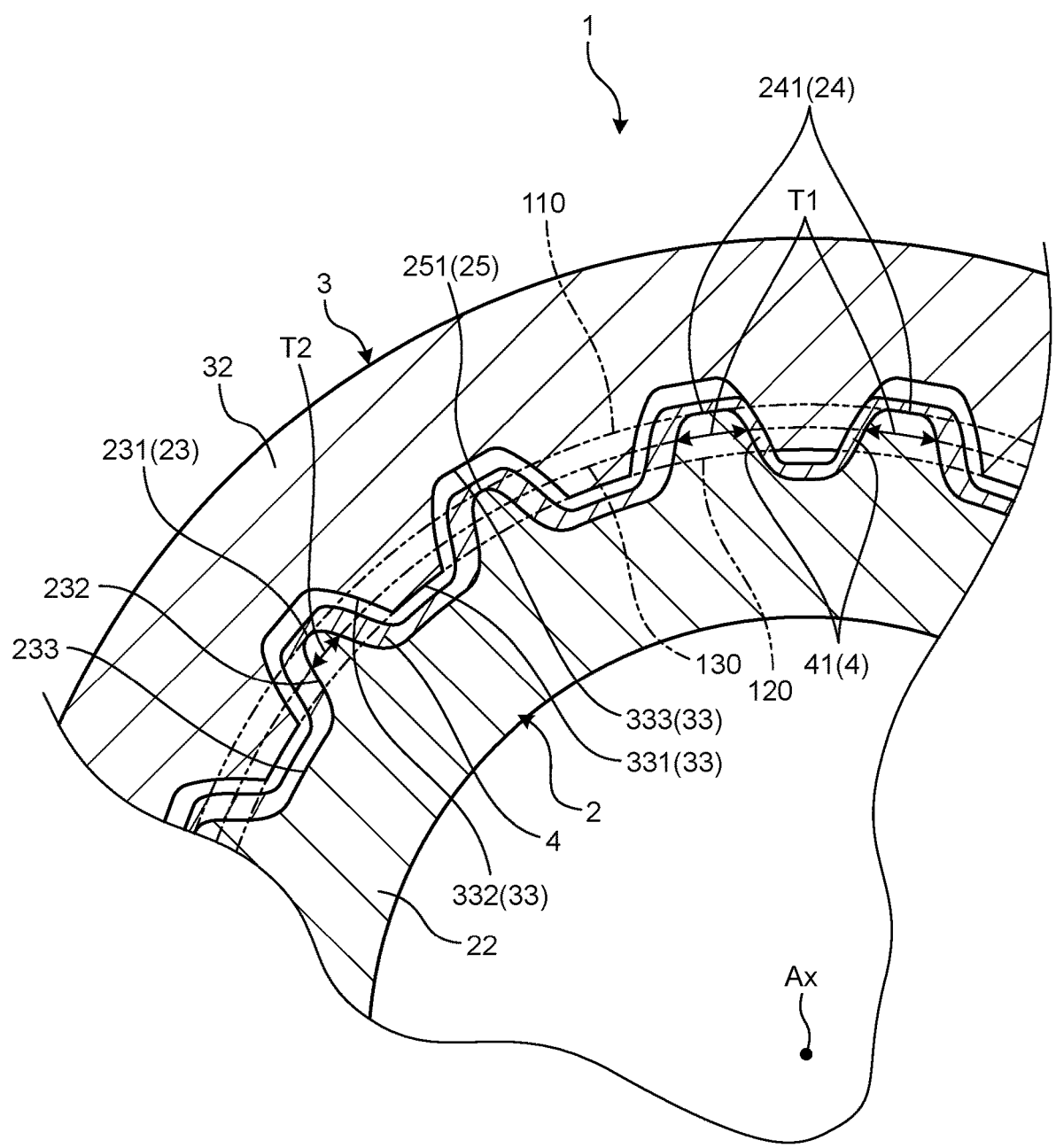
FIG. 6 is an enlarged schematic diagram of part of FIG. 5.

FIG. 4 is a schematic diagram illustrating a section taken along line IV-IV in FIG. 3. FIG. 5 is a schematic diagram illustrating a section of the inner shaft and the resin layer in FIG. 4. FIG. 6 is an enlarged schematic diagram of part of FIG. 5. As illustrated in FIGS. 4 and 5, the inner shaft 2 includes a tubular part 22 and first tooth parts 23. A wide range of metals such as carbon steel is applicable as the inner shaft 2.

The tubular part 22 is formed in an internally hollow shape and extends in a cylindrical shape in the circumferential direction about the central axis Ax. In this manner, the inner shaft 2 is a hollow member. The first tooth parts 23 protrude outward in the radial direction on the outer peripheral surface of the inner shaft 2. The plurality of first tooth parts 23 are disposed at equally spaced positions in the circumferential direction on the outer peripheral surface of the tubular part 22. Each first tooth part 23 includes a tooth tip 231, a tooth surface (side surface) 232, and a tooth bottom 233. The first tooth parts 23 include thick teeth 24 and thin teeth 25. A total of four thick teeth 24 are provided, two at an end part on a Y1 side and two at an end part on a Y2 side in FIG. 4. In the present embodiment, all first tooth parts 23 other than the thick teeth 24 are the thin teeth 25. Details thereof will be described later.

As illustrated in FIGS. 4 and 5, the resin layer 4 is provided on the outer peripheral surface of each first tooth part 23. Specifically, the resin layer 4 is provided on the outer peripheral side of the tooth tip 231, the tooth surface 232, and the tooth bottom 233 of each first tooth part 23. The resin layer 4 includes thin film parts 41 and thick film parts 42. A total of four thin film parts 41 are provided, one set on the end part on the Y1 side and one set at the end part on the Y2 side in FIG. 4. One set of thin film parts 41 and the other set of thin film parts 41 are disposed at positions symmetric with respect to the central axis Ax. In other words, one pair of thin film parts 41 are provided adjacent to each other in the circumferential direction at the end part on the Y1 side in FIG. 4, and the other pair are provided adjacent to each other in the circumferential direction at the end part on the Y2 side. In the present embodiment, all parts of the resin layer 4 facing the tooth surfaces 232 other than the thin film parts 41 are the thick film parts 42. In this manner, a total of four thin film parts 41 are provided at positions symmetric with respect to the central axis Ax. Note that the present disclosure is not limited thereto, and four or more thin film parts 41 may be provided or three or more thin film parts 41 may be disposed in the circumferential direction in each set. The plurality of sets of thin film parts 41 may be disposed at equally spaced positions in the circumferential direction but are not limited thereto, and the plurality of sets of thin film parts 41 may be disposed at unequally spaced positions. Further details thereof will be described later.

As illustrated in FIGS. 4 and 6, the outer shaft 3 includes a tubular part 32 and second tooth parts 33. A wide range of metals such as carbon steel is applicable as the outer shaft 3.

The tubular part 32 is formed in an internally hollow shape and extends in a cylindrical shape in the circumferential direction about the central axis Ax. The second tooth parts 33 protrude inward in the radial direction on the inner periphery of the tubular part 32. The plurality of second tooth parts 33 are disposed at equally spaced positions in the circumferential direction on the inner peripheral surface of the outer shaft 3. Each second tooth part 33 includes a tooth tip 331, a tooth surface 332, and a tooth bottom 333. All second tooth parts 33 have the same width in the circumferential direction.

Figure 7:
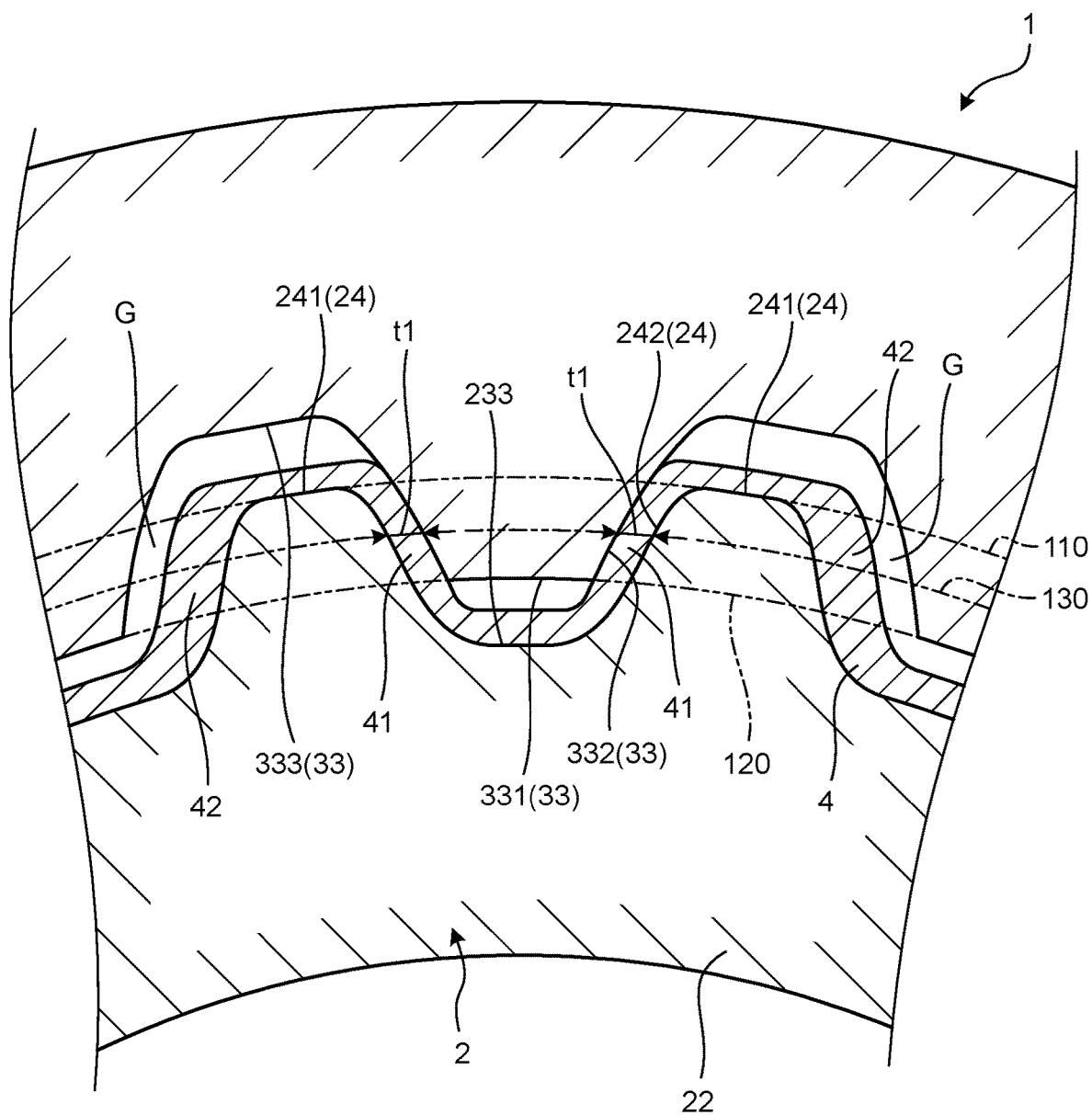
FIG. 7 is an enlarged schematic diagram of part of FIG. 5.
Figure 8:
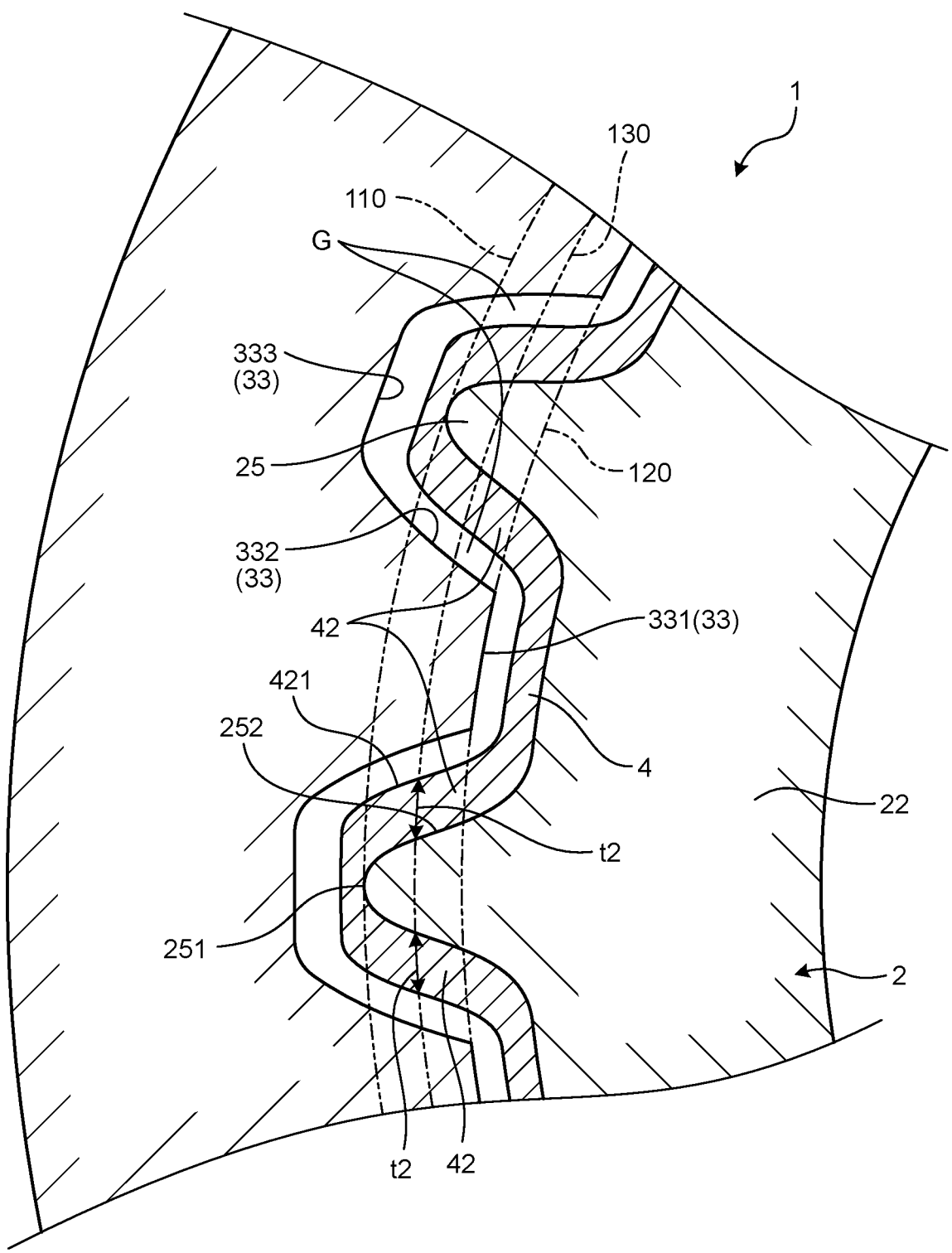
FIG. 8 is an enlarged schematic diagram of part of FIG. 5.

FIG. 7 is an enlarged schematic diagram of part of FIG. 5. FIG. 8 is an enlarged schematic diagram of part of FIG. 5. As illustrated in FIGS. 6 to 8, a first virtual line 110, a second virtual line 120, and a third virtual line 130 are set at a section of the inner shaft 2 orthogonal to the central axis Ax. The first virtual line 110 extends in the circumferential direction about the central axis Ax through the tooth tip (outer peripheral end) 231 of each first tooth part 23. The second virtual line 120 extends in the circumferential direction about the central axis Ax through the tooth tip (inner peripheral end) 331 of each second tooth part 33. The third virtual line 130 extends in the circumferential direction through the middle of the first virtual line 110 and the second virtual line 120 in the radial direction.

As illustrated in FIG. 6, the width of each thick tooth 24 among the first tooth parts 23 along the third virtual line 130 is a width T1. The width of each thin tooth 25 along the third virtual line 130 is a width T2. The width T2 of each thin tooth 25 is smaller than the width T1 of each thick tooth 24. The thick tooth 24 includes a tooth tip 241 and a tooth surface (side surface) 242. The thin tooth 25 includes a tooth tip 251 and a tooth surface (side surface) 252.

As illustrated in FIG. 7, each thin film part 41 of the resin layer 4 is provided between a thick tooth 24 among the first tooth parts 23 and a second tooth parts 33. Specifically, each thin film part 41 contacts both the tooth surface 242 of a thick tooth 24 and the tooth surface 332 of a second tooth part 33. The number of first tooth parts 23 (thick teeth 24) disposed between one set of thin film parts 41 adjacent to each other in the circumferential direction is one. The thickness of each thin film part 41 along the third virtual line 130 is a thickness t1. A plurality of sets of thin film parts 41 are disposed at intervals in the circumferential direction. Note that one set of thin film parts means a collection of thin film parts disposed adjacent to each other in the circumferential direction. The thickness t1 of each thin film part 41 is preferably, for example, equal to or smaller than 0.2 mm.

As illustrated in FIG. 8, in the present embodiment, each thick film part 42 is a part of the resin layer 4 other than the thin film parts 41, the part being disposed between a tooth surface 232 (refer to FIG. 6) and a tooth surface 332. Specifically, each thick film part 42 of the resin layer 4 is provided between a thin tooth 25 among the first tooth parts 23 and a second tooth part 33. More specifically, each thick film part 42 is provided between the tooth surface 252 of a thin tooth 25 and the tooth surface 332 of a second tooth part 33. The thickness of each thick film part 42 along the third virtual line 130 is a thickness t2. The thickness t1 of each thin film part 41 is smaller than the thickness t2 of each thick film part 42. Note that, as illustrated in FIG. 8, a side surface 421 of each thick film part 42 is separated from the tooth surface 332 of the corresponding second tooth part 33. In other words, a gap G is provided between the side surface 421 of each thick film part 42 and the tooth surface 332 of the corresponding second tooth part 33. The gap G is provided, for example, in a case of temperature of 80° or lower.

Figure 9:
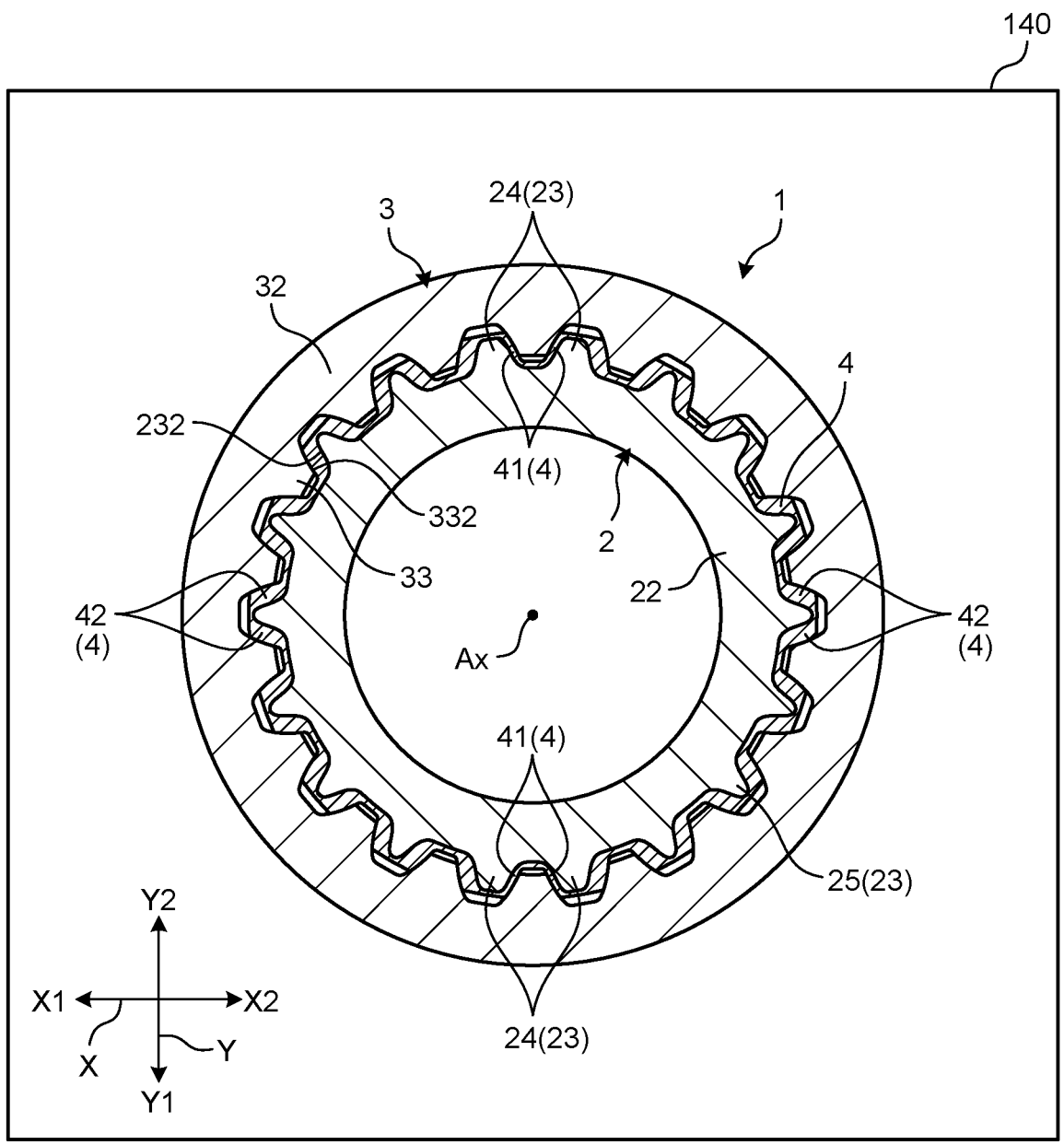
FIG. 9 is a schematic diagram for description of a method of manufacturing the lower shaft of the first embodiment and is a diagram illustrating a state in which the lower shaft after a resin layer formation process has ended is housed inside a heating furnace.
Figure 10:
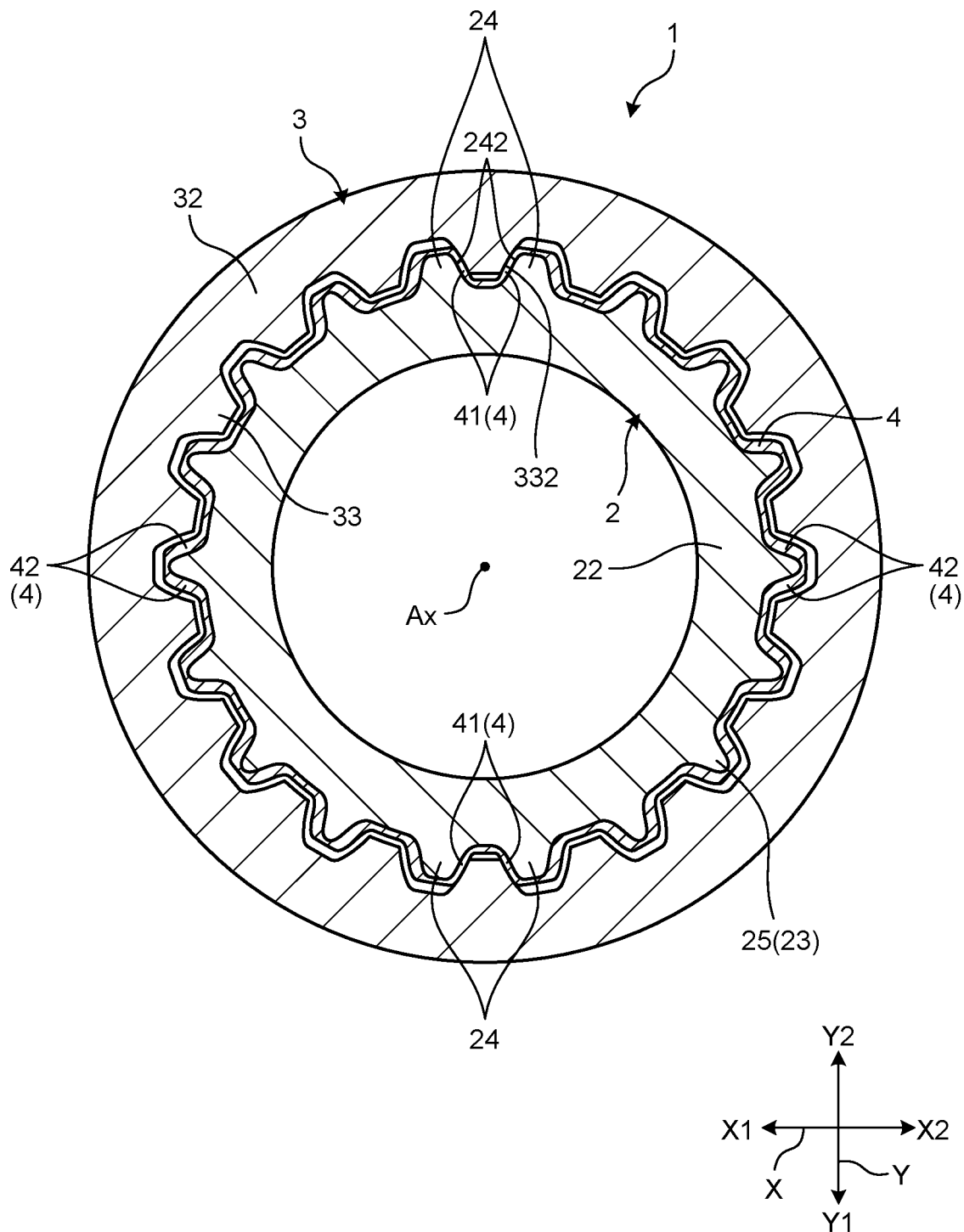
FIG. 10 is a schematic diagram for description of the method of manufacturing the lower shaft of the first embodiment and is a diagram illustrating a cooling process.

The following describes a method of manufacturing the lower shaft (steering shaft) 1. FIG. 9 is a schematic diagram for description of the method of manufacturing the lower shaft of the first embodiment and is a diagram illustrating a state in which the lower shaft 1 after a resin layer formation process has ended is housed inside a heating furnace. FIG. 10 is a schematic diagram for description of the method of manufacturing the lower shaft of the first embodiment and is a diagram illustrating a cooling process.

First, the lower shaft 1 is assembled by forming the resin layer 4 on the outer peripheral side of the inner shaft 2 and fitting the outer shaft 3 on the outer peripheral side of the inner shaft 2 through the resin layer 4. In the state in which the inner shaft 2 is fitted to the outer shaft 3, a gap in the radial direction is provided between the resin layer 4 and the tooth bottom 333 (refer to FIG. 8) of each second tooth part 33. No gap G (refer to FIG. 8) is provided between the tooth surface 332 of each second tooth part 33 and the resin layer 4. Accordingly, the resin layer 4 contacts the tooth surfaces 232 of all first tooth parts 23 and the tooth surfaces 332 of all second tooth parts 33. Thus, one set of thin film parts 41 of the resin layer 4 are disposed at each of the end part on the Y1 side and the end part on the Y2 side in FIG. 9. In this state, as illustrated in FIG. 9, the lower shaft 1 is housed inside a heating furnace 140 in a heating process.

The internal temperature of the heating furnace 140 is increased to, for example, 130°. The linear expansion coefficient of resin is higher than that of metal, and thus the resin layer 4 more largely expands than the inner shaft 2 and the outer shaft 3, which are made of metal. As described above, one set of thin film parts 41 are disposed at each of the end part on the Y side and the end part on the Y2 side. Thus, when the resin layer 4 thermally expands, thick film parts 42 at an end part on an X1 side and an end part on an X2 side more largely expand in the circumferential direction than the thin film parts 41 at the end part on the Y1 side and the end part on the Y2 side. Furthermore, part of the resin of the thick film parts 42 moves outward in the radial direction. Since the thickness of each thin film part 41 in the circumferential direction is smaller than that of each thick film part 42, the thermal expansion amount of each thin film part 41 when heated is smaller than that of each thick film part 42. Accordingly, the resin of the thin film parts 41 is unlikely to move outward in the radial direction in the heating process. Subsequently, as illustrated in FIG. 10, the inner shaft 2 and the outer shaft 3 are taken out of the heating furnace 140 and cooled in the cooling process. Accordingly, the part of the resin of the thick film parts 42 is solidified in the state of having moved outward in the radial direction. The thin film parts 41 are solidified in the state of hardly having moved outward in the radial direction.

Accordingly, as illustrated in FIG. 10, each of the thin film parts 41 at the end part on the Y1 side and the end part on the Y2 side contacts both the tooth surface 242 of the corresponding thick tooth 24 and the tooth surface 332 of the corresponding second tooth part 33. At each thick film part 42, the gap G is formed between the tooth surface 332 of the corresponding second tooth part 33 and the resin layer 4 as described above with reference to FIG. 8.

Figure 11:
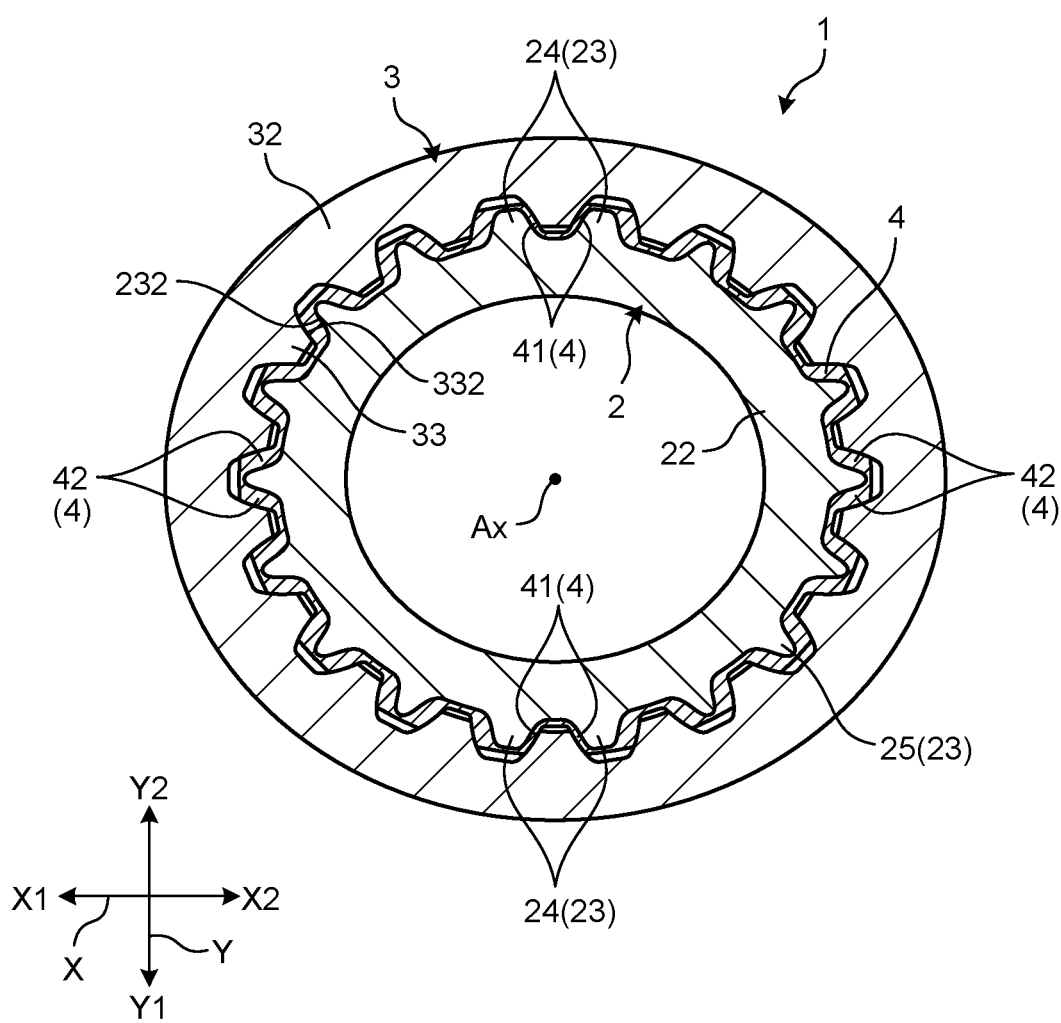
FIG. 11 is a schematic diagram illustrating deformation movement of the inner shaft and an outer shaft when the lower shaft of the first embodiment is exposed in a high-temperature environment.

The following describes, with reference to FIG. 11, deformation movement when the lower shaft is exposed in a high-temperature environment. FIG. 11 is a schematic diagram illustrating deformation movement of the inner shaft and the outer shaft when the lower shaft of the first embodiment is exposed in a high-temperature environment. The following description is separately made for a case in which the stiffness of the inner shaft 2 is higher than the stiffness of the outer shaft 3 and a case in which the stiffness of the inner shaft 2 is lower than the stiffness of the outer shaft 3.

Case in which the Stiffness of the Inner Shaft 2 is Higher than the Stiffness of the Outer Shaft 3

When the thickness of the outer shaft 3 and the thickness of the inner shaft 2 in the radial direction are substantially equal to each other, the stiffness of the outer shaft 3 in the radial direction is lower than that of the inner shaft 2. When the lower shaft 1 is exposed at high temperature, the expansion amount (elastic deformation amount) of the inner shaft 2 is extremely small and the outer shaft 3 more largely expands (elastically deforms) than the inner shaft 2.

In a high-temperature environment, when the resin layer 4 expands in the circumferential direction, the side surface 421 (refer to FIG. 8) of each thick film part 42 contacts the tooth surface 332 of the corresponding second tooth part 33 and the thick film part 42 presses and expands the tooth surface 332 of the second tooth part 33 in the circumferential direction in some cases. Furthermore, in a room-temperature environment, each thin film part 41 contacts the tooth surface 232 of the corresponding first tooth part 23 and the tooth surface 332 of the corresponding second tooth part 33. However, in a case of thermal expansion in a high-temperature environment, force with which each thick film part 42 presses and expands the corresponding second tooth part 33 in the circumferential direction is larger than force with which each thin film part 41 presses and expands the corresponding second tooth part 33 since the thick film part 42 is thicker than the thin film part 41. As described above, the thin film parts 41 are positioned at the end part on the Y1 side and the end part on the Y2 side in the inner shaft 2. Thus, in the outer shaft 3, the deformation amounts of sites on the X1 side and the X2 side in the circumferential direction are larger than those of sites on the Y1 side and the Y2 side, and accordingly, the outer shaft 3 on the outer peripheral side extends in the X direction and elastically deforms into a horizontally long shape. Since the deformation amount of the inner shaft 2 is extremely small and smaller than the deformation amount of the outer shaft 3, the inner shaft 2 exposed at high temperature holds, for example, a substantially true circular shape. As described above, the outer shaft 3 expands in the X direction and elastically deforms into a horizontally long elliptical shape as illustrated in FIG. 11, and the resin layer 4 hardly moves outward in the radial direction. Back in a room-temperature environment thereafter, the resin layer 4 contracts and the outer shaft 3 returns into the original shape. Accordingly, again in the room-temperature environment, each thin film part 41 contacts the tooth surfaces of the corresponding first tooth part 23 and the corresponding second tooth part 33, and the gap G (refer to FIG. 8) is generated between each thick film part 42 and the corresponding tooth surface 332.

Case in which the Stiffness of the Inner Shaft 2 is Lower than the Stiffness of the Outer Shaft 3

When the thickness of the inner shaft 2 in the radial direction is smaller than the thickness of the outer shaft 3 in the radial direction and the stiffness of the inner shaft 2 in the radial direction is lower than that of the outer shaft 3, the inner shaft 2 more largely elastically deforms than the outer shaft 3 in a high-temperature environment. In a high-temperature environment, force with which each thin film part 41 contacts the tooth surface 232 of the corresponding first tooth part 23 and the tooth surface 332 of the corresponding second tooth part 33 and each thick film part 42 presses and expands the corresponding second tooth part 33 acts in some cases as the resin layer 4 expands. Force with which each thick film part 42 presses and expands the corresponding second tooth part 33 is larger than force with which each thin film part 41 presses and expands the corresponding second tooth part 33. Since the stiffness of the inner shaft 2 in the radial direction is lower than that of the outer shaft 3, the inner shaft 2 on the inner peripheral side elastically deforms and extends in the Y direction and the outer shaft 3 has an extremely small elastic deformation amount and holds a substantially true circular shape. Accordingly, the inner shaft 2 expands in the Y direction, and thus the inner shaft 2 elastically deforms into a vertically long elliptical shape, and the resin layer 4 hardly moves outward in the radial direction. Back in a room-temperature environment thereafter, the resin layer 4 contracts and the outer shaft 3 returns into the original shape. Accordingly, again in the room-temperature environment, each thin film part 41 contacts the tooth surfaces of the corresponding first tooth part 23 and the corresponding second tooth part 33, and the gap G (refer to FIG. 8) is generated between each thick film part 42 and the corresponding tooth surface 332.

As described above, the lower shaft (steering shaft) 1 according to the first embodiment includes: the inner shaft 2 including the plurality of first tooth parts 23 arranged in the circumferential direction on the outer peripheral surface of the inner shaft 2; the outer shaft 3 including the plurality of second tooth parts 33 and disposed on the outer peripheral side of the first tooth parts 23, the second tooth parts 33 being arranged in the circumferential direction on the inner peripheral surface of the outer shaft 3; and the resin layer 4 disposed between the plurality of first tooth parts 23 and the plurality of second tooth parts 33. The resin layer 4 includes the plurality of thick film parts 42 and the at least four thin film parts 41, each thick film part 42 is disposed between the tooth surface 232 of the corresponding first tooth part 23 and the tooth surface of the corresponding second tooth part 33 with a gap from the second tooth part 33, and each thin film part 41 is disposed between the tooth surface 232 of the corresponding first tooth part 23 and the tooth surface 332 of the corresponding second tooth part 33 and contacts both the first tooth part 23 and the second tooth part 33. At a section orthogonal to the central axis Ax of the inner shaft 2, the thickness t1 of each thin film part 41 along the third virtual line 130 is smaller than the thickness t2 of each thick film part 42 along the third virtual line 130, the first virtual line 110 extending in the circumferential direction through the outer peripheral end of each first tooth part 23, the second virtual line 120 extending in the circumferential direction through the inner peripheral end of each second tooth part 33, the third virtual line 130 extending in the circumferential direction through the middle of the first virtual line 110 and the second virtual line 120 in the radial direction.

In this manner, each thin film part 41 is disposed between the tooth surface 232 of the corresponding first tooth part 23 and the tooth surface 332 of the corresponding second tooth part 33 and contacts both the first tooth part 23 and the second tooth part 33. Specifically, the tooth surface 232 of each first tooth part 23, the tooth surface 332 of the corresponding second tooth part 33, and the corresponding thin film part 41 therebetween that are adjacent to one another in the circumferential direction contact without a gap, and at least four of the thin film parts 41 are provided. In a high-temperature environment, the resin layer 4 expands in the circumferential direction and contacts the tooth surface 232 of each first tooth part 23 and the tooth surface 332 of each second tooth part 33 without a gap. Since the thickness of each thin film part 41 in the circumferential direction is smaller than that of each thick film part 42, the thermal expansion amount of each thin film part 41 in the circumferential direction is smaller than that of each thick film part 42 in a high-temperature environment. Thus, the resin of the thin film parts 41 is less likely to move outward in the radial direction than the thick film parts 42 in a high-temperature environment. Accordingly, a gap is unlikely to be generated around the thin film parts 41 in a room-temperature environment after a high-temperature environment. Thus, in the steering shaft 1 of the first embodiment, backlash in a room-temperature environment after a high-temperature environment is smaller than in the steering shaft of Patent Literature 1, and rattle sound generated during vehicle traveling can be further reduced.

The number of second tooth parts 33 disposed between the thin film parts 41 of each set is one, and the plurality of sets of thin film parts 41 are disposed at equally spaced positions in the circumferential direction. Thus, in the steering shaft 1 of the first embodiment, backlash is further smaller than in the steering shaft of Patent Literature 1, and rattle sound generated during vehicle traveling can be further reduced.

The inner shaft 2 is a hollow member. Accordingly, the deflection stiffness of the inner shaft 2 in the radial direction is lower. Thus, in the steering shaft 1 of the first embodiment, backlash can be further reduced and large torque can be transferred. Moreover, the weight of the steering shaft 1 is reduced.

The plurality of first tooth parts 23 include the thick teeth 24 and the thin teeth 25 the width of each of which in the circumferential direction is smaller than the width of each thick tooth 24 in the circumferential direction, and each thin film part 41 contacts both one of the thick teeth 24 and one of the second tooth parts 33. In this manner, it is possible to easily form the thin film parts 41 of the resin layer 4 by replacing some of the plurality of first tooth parts 23 with the thick teeth 24.

The number of the plurality of sets of thin film parts 41 is two, and thus backlash of the steering shaft can be reduced with the reduced number of sets thin film parts 41, and rattle sound generated during vehicle traveling can be further reduced.

The method of manufacturing the lower shaft (steering shaft) 1 of the first embodiment includes: the resin layer formation process of forming the resin layer 4 on the inner shaft 2 including the plurality of first tooth parts 23 arranged in the circumferential direction on the outer peripheral surface; the heating process of heating the inner shaft 2, the outer shaft 3, and the resin layer 4 in a state in which the resin layer 4 contacts the tooth surfaces 232 of all first tooth parts 23 and the tooth surfaces 332 of all second tooth parts 33; and the cooling process of cooling the inner shaft 2, the outer shaft 3, and the resin layer 4 after the heating process, and the plurality of first tooth parts 23 include the thick teeth 24 and the thin teeth 25 the width of each of which in the circumferential direction is smaller than the width of each thick tooth 24 in the circumferential direction.

The gap between the tooth surface 242 of each thick tooth 24 among the first tooth parts 23 and the tooth surface 332 of the corresponding second tooth part 33 in the circumferential direction is smaller than the gap between the tooth surface 252 of each thin tooth 25 among the first tooth parts 23 and the tooth surface 332 of the corresponding second tooth part 33 in the circumferential direction. Accordingly, the resin layer 4 disposed in the gap between each thick tooth 24 and the corresponding second tooth part 33 is a thin film part 41, and the resin layer 4 disposed in the gap between each thin tooth 25 and the corresponding second tooth part 33 is a thick film part 42. Part of the resin of the thick film parts 42 moves outward in the radial direction in the heating process and solidifies there in the cooling process, and thus a gap is generated between each solidified thick film part 42 and the tooth surface 332 of the corresponding second tooth part 33. However, the thin film parts 41 do not move outward in the radial direction as much as the thick film parts 42 do in the heating process. Thus, no gap is generated around the thin film parts 41 in the cooling process. In this manner, the thin film parts 41 and the thick film parts 42 of the resin layer 4 can be shaped by easy work. Note that, when the steering shaft of Patent Literature 1 is exposed in a high-temperature environment thereafter, all resin layer parts of the first tooth parts expand and the slide resistance of all resin layer parts with the tooth surfaces of all second tooth parts potentially becomes high. However, when the steering shaft of the present disclosure is exposed in a high-temperature environment (for example, at 80° or 100°), each thin film part 41 contacts the tooth surface of the corresponding first tooth part 23 and the tooth surface of the corresponding second tooth part 33 but each thick film part 42 other than the thin film parts 41 has a gap to the tooth surface of the corresponding tooth part in a room-temperature environment (for example, at 80° or lower), and thus force of contact with the tooth surfaces of the tooth parts in a high-temperature environment is weak and the slide resistance of the resin layer 4 with the tooth surfaces of the tooth parts in the steering shaft of the present disclosure is smaller than in Patent Literature 1.

Second Embodiment

The following describes a steering shaft according to a second embodiment, but any site having the same structure as the steering shaft of the first embodiment described above is denoted by the same reference sign and description thereof is omitted.

Figure 12:
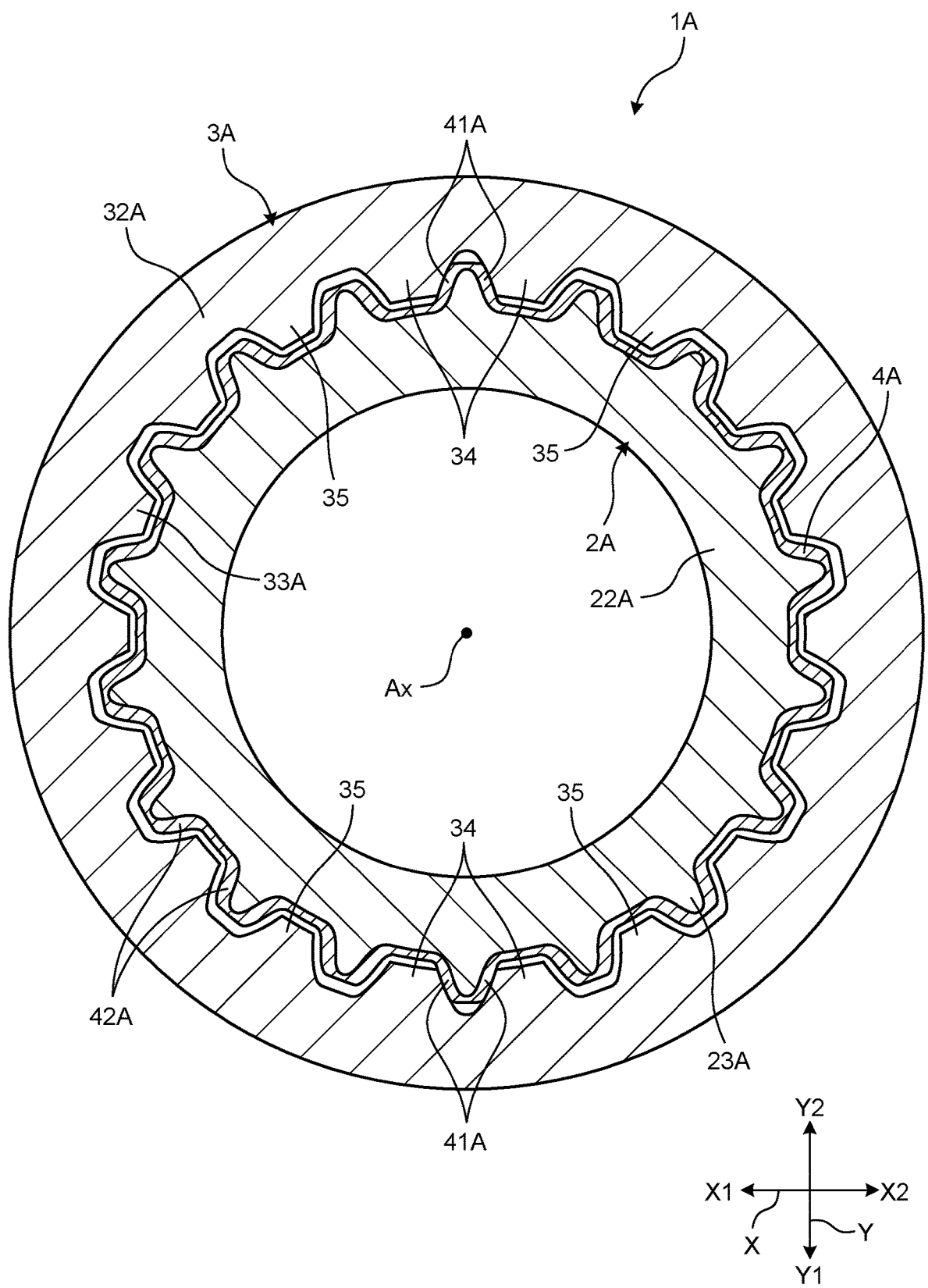
FIG. 12 is a schematic diagram illustrating a section of a lower shaft according to a second embodiment.
Figure 13:
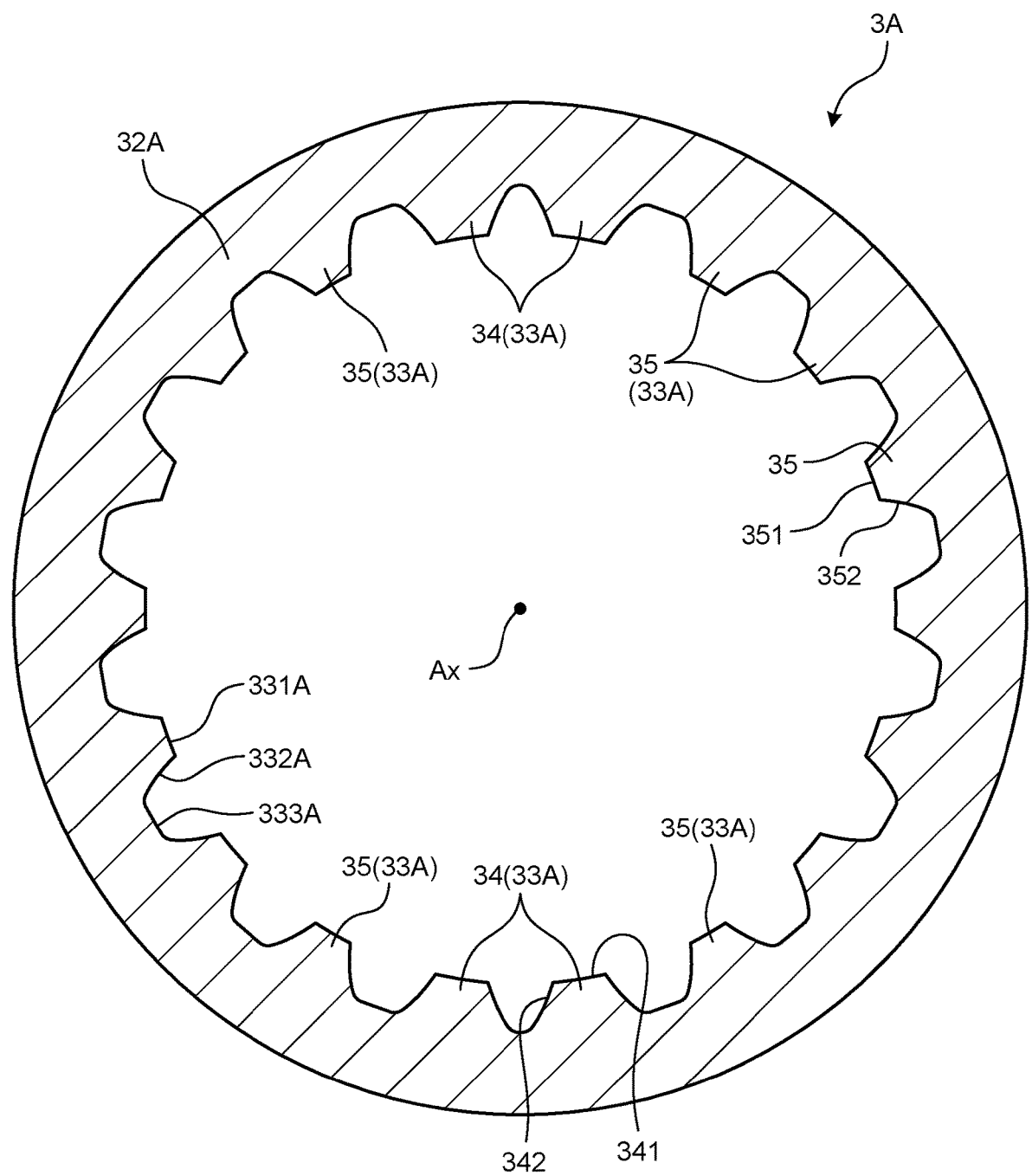
FIG. 13 is a schematic diagram illustrating a section of an outer shaft in FIG. 12.
Figure 14:
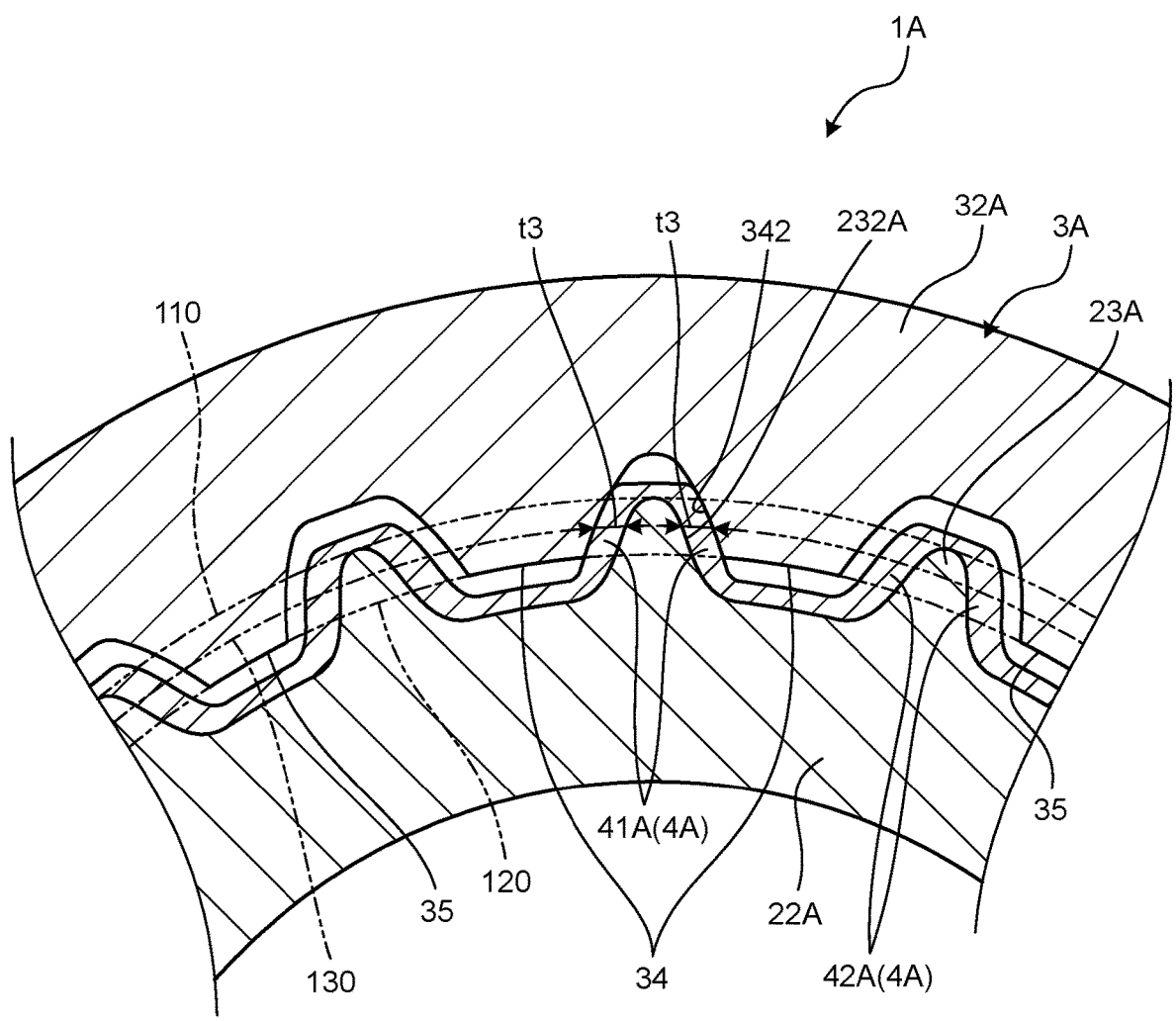
FIG. 14 is an enlarged schematic diagram of part of FIG. 12.
Figure 15:
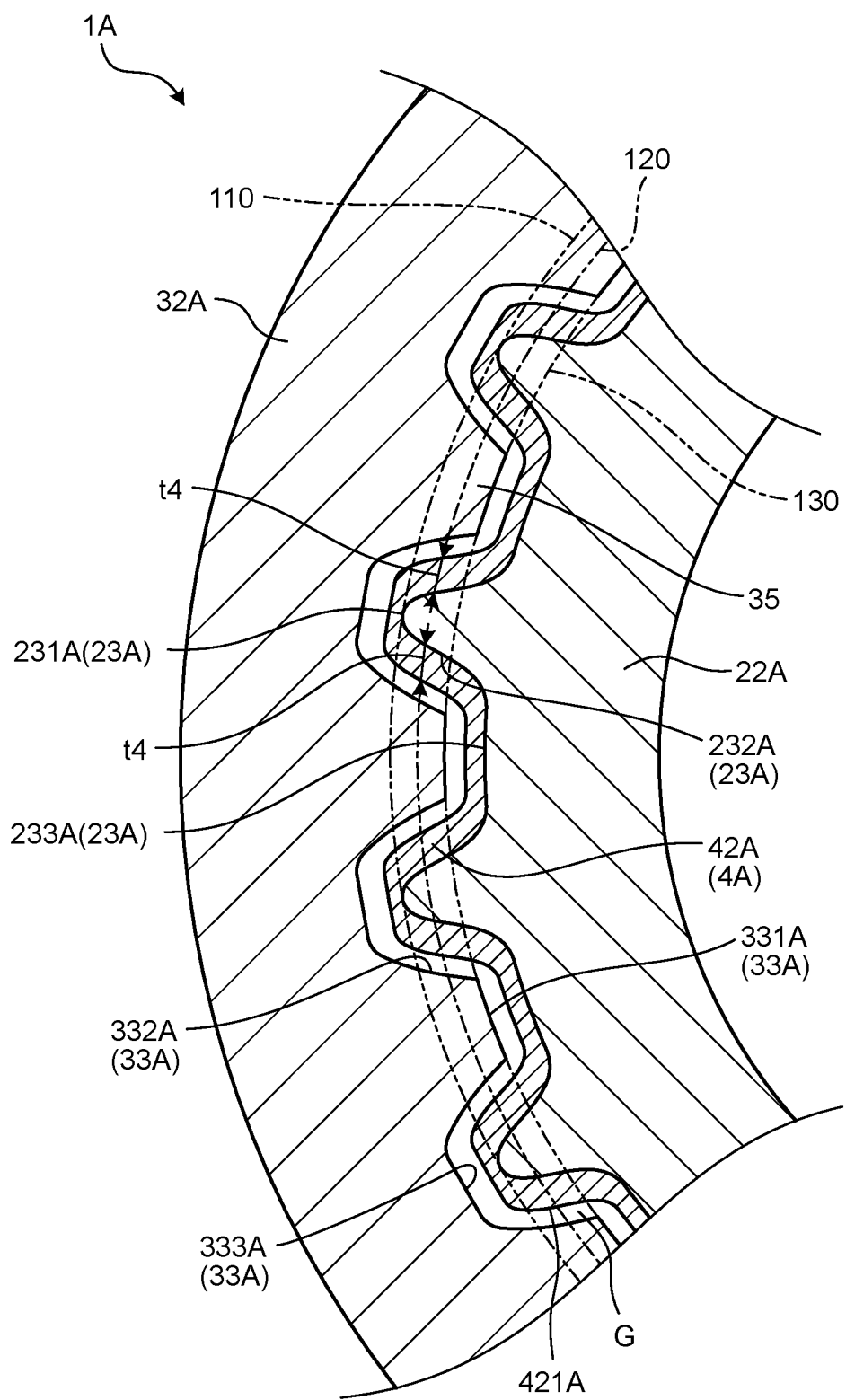
FIG. 15 is an enlarged schematic diagram of part of FIG. 12.

FIG. 12 is a schematic diagram illustrating a section of a lower shaft according to the second embodiment. FIG. 13 is a schematic diagram illustrating a section of an outer shaft in FIG. 12. FIG. 14 is an enlarged schematic diagram of part of FIG. 12. FIG. 15 is an enlarged schematic diagram of part of FIG. 12.

As illustrated in FIG. 12, a lower shaft (steering shaft) 1A includes an inner shaft 2A, an outer shaft 3A, and a resin layer 4A. Although the widths of all second tooth parts 33 are equal in the first embodiment, but second tooth parts 33A of the second embodiment include thick teeth 34 and thin teeth 35 the width of each of which in the circumferential direction is smaller than the width of each thick tooth 34 in the circumferential direction. Each thick tooth 34 includes a tooth tip 341 and a tooth surface (side surface) 342. Each thin tooth 35 includes a tooth tip 351 and a tooth surface (side surface) 352. Moreover, although the first tooth parts 23 include the thick teeth 24 and the thin teeth 25 in the first embodiment, the widths of all first tooth parts 23A of the second embodiment are equal. Each thin film part 41A of the resin layer 4A contacts both the corresponding thick tooth 34 and the corresponding first tooth part 23A.

As illustrated in FIG. 12, the inner shaft 2A includes a tubular part 22A and the first tooth parts 23A. A wide range of metals such as carbon steel is applicable as the inner shaft 2A.

The inner shaft 2A is a hollow member. The plurality of first tooth parts 23A are disposed at equally spaced positions in the circumferential direction on the outer peripheral surface of the inner shaft 2A. As illustrated in FIG. 15, each first tooth part 23A includes a tooth tip 231A, a tooth surface (side surface) 232A, and a tooth bottom 233A. The widths of all first tooth parts 23A are equal.

As illustrated in FIG. 12, the resin layer 4 includes the thin film parts 41A and thick film parts 42A. A total of four thin film parts 41A are provided, one set at the end part on the Y1 side and one set at the end part on the Y2 side in FIG. 12. In other words, one set of thin film parts 41 are provided adjacent to each other in the circumferential direction at the end part on the Y1 side in FIG. 12, and the other set are provided adjacent to each other in the circumferential direction at the end part on the Y2 side. Each thick film part 42A is a part disposed between a tooth surface 232A and a tooth surface 332A of the resin layer 4A and is a part other than the thin film parts 41A. In this manner, a total of four thin film parts 41A are provided at positions symmetric with respect to the central axis Ax. Note that the present disclosure is not limited thereto, and four or more thin film parts 41A may be provided or three or more thin film parts 41A may be disposed in the circumferential direction in each set. The plurality of sets of thin film parts 41A may be disposed at equally spaced positions in the circumferential direction but are not limited thereto, and the plurality of sets of thin film parts 41A may be disposed at unequally spaced positions.

As illustrated in FIGS. 12 and 13, the outer shaft 3A includes a tubular part 32A and the second tooth parts 33A. A wide range of metals such as carbon steel is applicable as the outer shaft 3A.

As illustrated in FIGS. 14 and 15, the plurality of second tooth parts 33A are disposed at equally spaced positions in the circumferential direction on the inner peripheral surface of the outer shaft 3A. As illustrated in FIG. 15, each second tooth part 33A includes a tooth tip 331A, a tooth surface (side surface) 332A, and a tooth bottom 333A. As illustrated in FIGS. 12 and 13, the second tooth parts 33A include the thick teeth 34 and the thin teeth 35 the width of each of which in the circumferential direction is smaller than the width of each thick tooth 34 in the circumferential direction. A total of four thick teeth 34 are provided, two at the end part on the Y1 side and two provided at the end part on the Y2 side in FIG. 12. In the present embodiment, all teeth other than the thick teeth 34 are the thin teeth 35.

As illustrated in FIG. 14, each thin film part 41A of the resin layer 4A is provided between the corresponding thick tooth 34 among the second tooth parts 33A and the corresponding first tooth part 23A. Specifically, each thin film part 41A contacts both the tooth surface 342 of the corresponding thick tooth 34 and the tooth surface 232A of the corresponding first tooth part 23A. The number of first tooth parts 23A disposed between one set of thin film parts 41A adjacent to each other in the circumferential direction is one. The thickness of each thin film part 41A along the third virtual line 130 is a thickness t3.

As illustrated in FIG. 15, the thick film parts 42A are the resin layer 4A at sites other than the thin film parts 41A. Specifically, each thick film part 42A is provided between the tooth surface 232A of the corresponding first tooth part 23A and the tooth surface 332A of the corresponding second tooth part 33A. The thickness of each thick film part 42A along the third virtual line 130 is a thickness t4. The thickness t3 of each thin film part 41A is smaller than the thickness t4 of each thick film part 42A. Note that a gap G is provided between a side surface 421A of each thick film part 42A and the tooth surface 332A of the corresponding second tooth part 33A.

Note that a method of manufacturing the lower shaft (steering shaft) 1A of the second embodiment is the same as the method of manufacturing the lower shaft (steering shaft) 1 of the first embodiment in effect. Specifically, the method of manufacturing the lower shaft 1A includes: the resin layer formation process of forming the resin layer 4A on the inner shaft 2A including the plurality of first tooth parts 23A; the heating process of heating the inner shaft 2A, the outer shaft 3A, and the resin layer 4A inside the heating furnace 140 (refer to FIG. 9) in a state in which the resin layer 4 contacts the tooth surfaces 232A of all first tooth parts 23A and the tooth surfaces 332A of all second tooth parts 33A; and the cooling process of cooling the inner shaft 2A, the outer shaft 3A, and the resin layer 4A after the heating process, and the plurality of second tooth parts 33A include the thick teeth 34 and the thin teeth 35 the width of each of which in the circumferential direction is smaller than the width of each thick tooth 34 in the circumferential direction.

In the heating process, when the resin layer 4A thermally expands, the thick film parts 42A at the end part on the X1 side and the end part on the X2 side in FIG. 12 more largely expand in the circumferential direction than the thin film parts 41A at the end part on the Y1 side and the end part on the Y2 side. Furthermore, part of the resin of the thick film parts 42A moves outward in the radial direction. Since the thickness of each thin film part 41A in the circumferential direction is smaller than that of each thick film part 42A, the thermal expansion amount of each thin film part 41A when heated is smaller than that of each thick film part 42A. Accordingly, the resin of the thin film parts 41A is unlikely to move outward in the radial direction in the heating process. Thus, in the cooling process, the part of the resin of the thick film parts 42A is solidified in the state of having moved outward in the radial direction. The thin film parts 41A are solidified in the state of hardly having moved outward in the radial direction.

As described above, in the second embodiment, the plurality of second tooth parts 33A include the thick teeth 34 and the thin teeth 35 the width of each of which in the circumferential direction is smaller than the width of each thick tooth 34 in the circumferential direction, and each thin film part 41A contacts both the corresponding thick tooth 34 and the corresponding first tooth part 23A. In this manner, it is possible to easily form the thin film parts 41A by replacing some of the plurality of second tooth parts 33A with the thick teeth 34. The inner shaft 2A and the outer shaft 3A of the present embodiment can be employed for any of spline fitting and serration fitting.

The method of manufacturing the lower shaft (steering shaft) 1A of the second embodiment includes: the resin layer formation process of forming the resin layer 4A on the inner shaft 2A including the plurality of first tooth parts 23A arranged in the circumferential direction on the outer peripheral surface; the heating process of heating the inner shaft 2A, the outer shaft 3A, and the resin layer 4A in a state in which the resin layer 4A contacts the tooth surfaces 232A of all first tooth parts 23A and the tooth surfaces 332A of all second tooth parts 33A; and the cooling process of cooling the inner shaft 2A, the outer shaft 3A, and the resin layer 4A after the heating process, and the plurality of second tooth parts 33A include the thick teeth 34 and the thin teeth 35 the width of each of which in the circumferential direction is smaller than the width of each thick tooth 34 in the circumferential direction.

The gap between the tooth surface 342 of each thick tooth 34 among the second tooth parts 33A and the tooth surface 232A of the corresponding first tooth part 23A in the circumferential direction is smaller than the gap between the tooth surface 352 of each thin tooth 35 among the second tooth parts 33A and the tooth surface 232A of the corresponding first tooth part 23A in the circumferential direction. Accordingly, the resin layer 4A disposed in the gap between each thick tooth 34 and the corresponding first tooth part 23A is a thin film part 41A, and the resin layer 4A disposed in the gap between each thin tooth 35 and the corresponding first tooth part 23A is a thick film part 42A. Part of the resin of the thick film parts 42A moves in the radial direction in the heating process and solidifies there in the cooling process, and thus a gap is generated between each solidified thick film part 42A and the tooth surface 232A of the corresponding first tooth part 23A. However, since each thin film part 41A contacts the corresponding thick tooth 34 and the corresponding first tooth part 23A in any of the heating process and the cooling process, no gap is generated. In this manner, the thin film parts 41A and the thick film parts 42A of the resin layer 4A can be shaped by easy work.

Third Embodiment

The following describes a steering shaft according to a third embodiment, but any site having the same structure as the steering shaft of the first embodiment described above is denoted by the same reference sign and description thereof is omitted.

Figure 16:
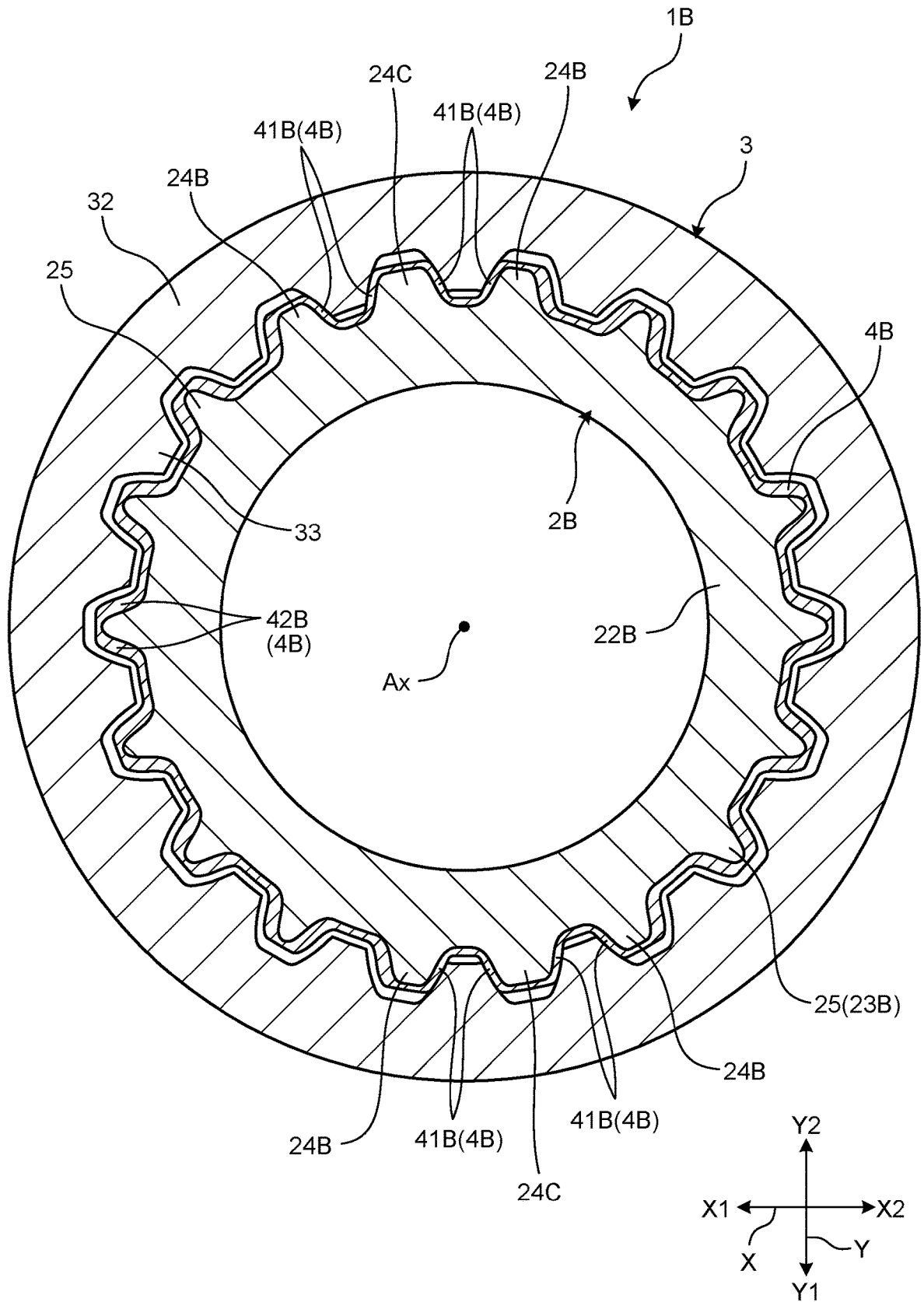
FIG. 16 is a schematic diagram illustrating a section of a lower shaft according to a third embodiment.
Figure 17:
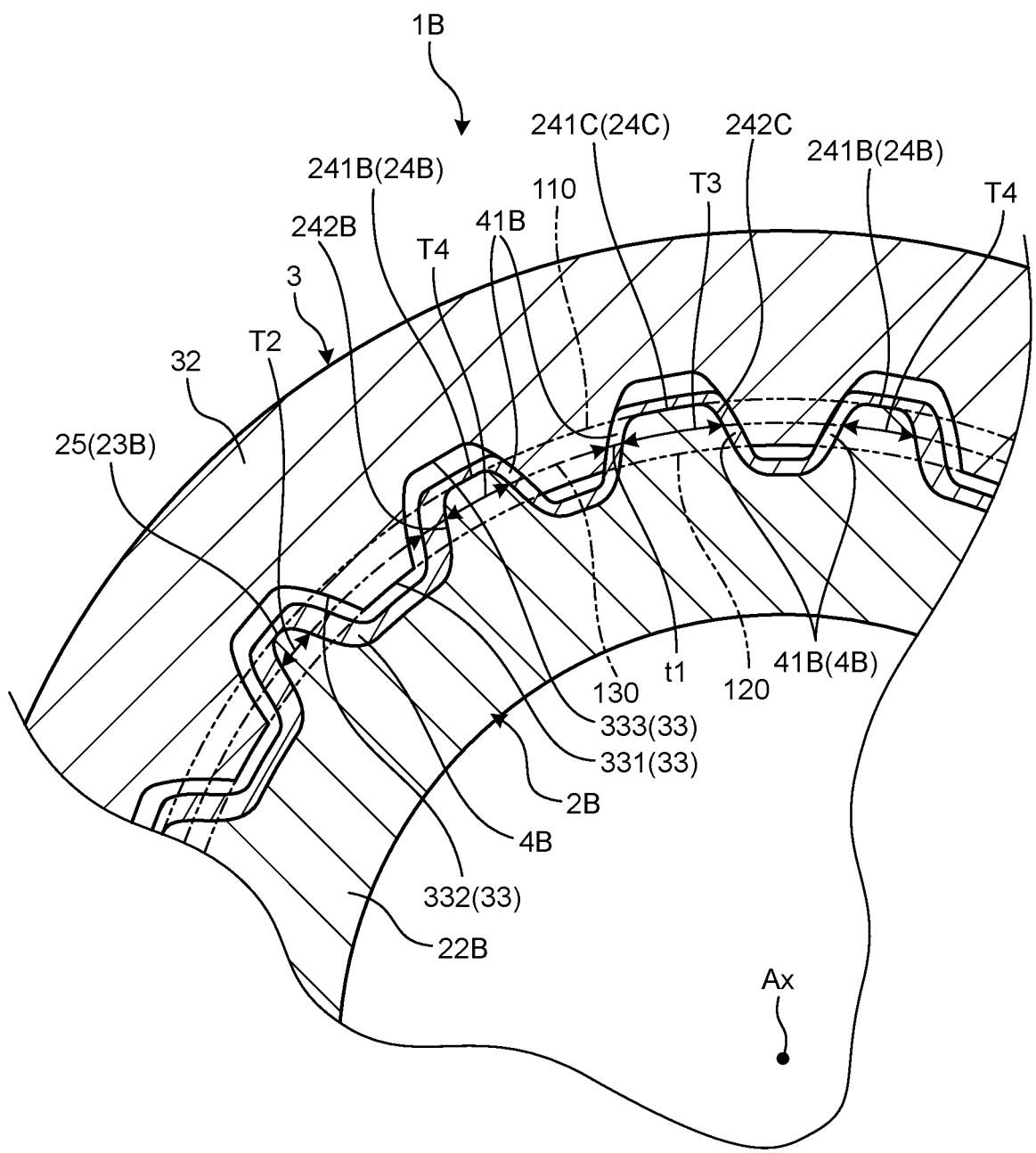
FIG. 17 is an enlarged schematic diagram of part of FIG. 16.

FIG. 16 is a schematic diagram illustrating a section of a lower shaft according to the third embodiment. FIG. 17 is an enlarged schematic diagram of part of FIG. 16. As illustrated in FIG. 16, a lower shaft (steering shaft) 1B of the third embodiment includes an inner shaft 2B, the outer shaft 3, and a resin layer 4B. The inner shaft 2B includes a tubular part 22B and first tooth parts 23B. A wide range of metals such as carbon steel is applicable as the inner shaft 2B.

The tubular part 22B is formed in an internally hollow shape and extends in a cylindrical shape in the circumferential direction about the central axis Ax. In this manner, the inner shaft 2B is a hollow member. The first tooth parts 23B protrude outward in the radial direction on the outer peripheral surface of the inner shaft 2B. The plurality of first tooth parts 23B are disposed at equally spaced positions in the circumferential direction on the outer peripheral surface of the tubular part 22B. Each first tooth part 23B includes a first thick tooth 24B, a second thick tooth 24C, and a thin tooth 25. Two first thick teeth 24B and one second thick tooth 24C are adjacent to one another in the circumferential direction. Specifically, a first thick tooth 24B, a second thick tooth 24C, and a first thick tooth 24B are arranged in the stated order when viewed in the clockwise direction as illustrated in FIG. 16.

As illustrated in FIG. 17, each first thick tooth 24B includes a tooth tip 241B and a tooth surface (side surface) 242B. Each second thick tooth 24C includes a tooth tip 241C and a tooth surface (side surface) 242C. The width of each second thick tooth 24C along the third virtual line 130 is a width T3. The width of each first thick tooth 24B along the third virtual line 130 is a width T4. The width of each thin tooth 25 along the third virtual line 130 is the width T2. The width T4 of each first thick tooth 24B is larger than the width T2 of each thin tooth 25. The width T3 of each second thick tooth 24C is larger than the width T4 of each first thick tooth 24B.

As illustrated in FIGS. 16 and 17, the resin layer 4B includes thin film parts 41B and thick film parts 42B. A total of two sets thin film part 41B are provided, one set at the end part on the Y1 side and one set at the end part on the Y2 side in FIG. 16. Four thin film parts 41B are provided adjacent to each other in the circumferential direction in each set. In other words, a total of eight thin film parts 41B are provided.

As illustrated in FIG. 17, each thin film part 41B of the resin layer 4B is provided between the corresponding first thick tooth 24B and the corresponding second tooth part 33 or between the corresponding second thick tooth 24C and the second tooth part 33. Specifically, some thin film parts 41B each contact both the tooth surface 242B of the corresponding first thick tooth 24B and the tooth surface 332 of the corresponding second tooth part 33. Some other thin film parts 41B each contact both the tooth surface 242C of the corresponding second thick tooth 24C and the tooth surface 332 of the corresponding second tooth part 33.

The thickness of each thin film part 41B along the third virtual line 130 is the thickness t1. In the present embodiment, the thin film parts of each set are four thin film parts 41B adjacent to one another in the circumferential direction. Four thin film parts 41B are provided at the end part on the Y1 side. Four thin film parts 41B are one set of thin film parts adjacent to each other in the circumferential direction. One set of thin film parts at the end part on the Y2 side and the other set of thin film parts at the end part on the Y1 side are disposed at positions symmetric with respect to the central axis Ax.

In this manner, a total of eight thin film part 41B are provided at positions symmetric with respect to the central axis Ax. Note that the present disclosure is not limited thereto, and eight or more thin film parts 41B may be provided or four or more thin film parts 41B may be disposed in the circumferential direction in each set. Moreover, the plurality of sets of thin film parts 41B may be disposed at equally spaced positions in the circumferential direction but are not limited thereto, and the plurality of sets of thin film parts 41B may be disposed at unequally spaced positions.

As described above, the lower shaft 1B according to the third embodiment includes two sets of thin film parts 41B, and each set includes four thin film parts 41B adjacent to one another in the circumferential direction. In this manner, in the present embodiment, since each set of thin film parts 41B includes four thin film parts 41B, backlash of the steering shaft is smaller than with two thin film parts 41 and rattle sound generated during vehicle traveling can be further reduced.

Note that the present disclosure is not limited to the above-described embodiments but is applicable to a wide range of technologies. For example, the resin layer 4, 4A, or 4B is formed at the first tooth parts 23, 23A, or 23B of the inner shaft 2, 2A, or 2B in each above-described embodiment but may be formed at the second tooth parts 33 or 33A of the outer shaft 3 or 3A. The number of first tooth parts 23, 23A, or 23B of the inner shaft 2, 2A, or 2B is 18 in the example of each embodiment but is not limited thereto, and a various number of teeth such as 19 or 23 teeth may be employed. The plurality of sets of thin film parts 41 are disposed at equally spaced positions in the circumferential direction in the example in each embodiment but are not limited thereto, and the plurality of sets of thin film parts 41 may be disposed at unequally spaced positions.

REFERENCE SIGNS LIST 1, 1A, 1B lower shaft (steering shaft)
2, 2A, 2B inner shaft
21 yoke part
22, 22A tubular part
23, 23A, 23B first tooth part
231, 231A tooth tip (outer peripheral end)
232, 232A tooth surface (side surface)
233, 233A tooth bottom
24 thick tooth
24B first thick tooth
24C second thick tooth
241, 241B, 241C tooth tip
242, 242B, 242C tooth surface
25 thin tooth
251 tooth tip
252 tooth surface
3, 3A outer shaft
31 yoke part
32, 32A tubular part
33, 33A second tooth part
331, 331A tooth tip (inner peripheral end)
332, 332A tooth surface (side surface)
333, 333A tooth bottom
34 thick tooth
341 tooth tip
342 tooth surface
35 thin tooth
351 tooth tip
352 tooth surface
4, 4A, 4B resin layer
41, 41A, 41B thin film part
42, 42A, 42B thick film part
80 steering device
81 steering wheel
82 upper shaft
82a input shaft
82b output shaft
83 steering force assist mechanism
87 pinion shaft
88 steering gear
88a pinion
88b rack
89 tie rod
90 ECU
92 deceleration device
93 electric motor
94 torque sensor
95 vehicle speed sensor
98 ignition switch 99 power source device
110 first virtual line
120 second virtual line
130 third virtual line
140 heating furnace
Ax central axis
T1, T2 width
t1, t2, t3 thickness

The invention claimed is:

1. A steering shaft comprising:
   an inner shaft including a plurality of first tooth parts arranged in a circumferential direction on an outer peripheral surface of the inner shaft;
   an outer shaft including a plurality of second tooth parts and disposed on an outer peripheral side of the first tooth part, the second tooth parts being arranged in the circumferential direction on an inner peripheral surface of the outer shaft; and
   a resin layer disposed between the plurality of first tooth parts and the plurality of second tooth parts, wherein
   the resin layer includes a plurality of thick film parts and at least four thin film parts,
   each of the thick film parts is disposed between a tooth surface of one of the first tooth parts and a tooth surface of one of the second tooth parts with a gap from one of the first tooth part and the second tooth part,
   each of the thin film parts is disposed between a tooth surface of one of the first tooth parts and a tooth surface of one of the second tooth parts and contacts both the first tooth part and the second tooth part, and
   at a section orthogonal to a central axis of the inner shaft and including a first virtual line, a second virtual line, and a third virtual line, the thickness of each of the thin film parts along the third virtual line is smaller than the thickness of each of the thick film parts along the third virtual line, the first virtual line extending in the circumferential direction through an outer peripheral end of each of the first tooth parts, the second virtual line extending in the circumferential direction through an inner peripheral end of each of the second tooth parts, the third virtual line extending in the circumferential direction through the middle of the first virtual line and the second virtual line in a radial direction.

2. The steering shaft according to claim 1, wherein a plurality of sets of the thin film parts are disposed at intervals in the circumferential direction.

3. The steering shaft according to claim 2, wherein the number of the plurality of sets of the thin film parts is two.

4. The steering shaft according to claim 1, wherein a plurality of sets of the thin film parts are disposed at equally spaced positions in the circumferential direction.

5. The steering shaft according to claim 1, wherein each set of the thin film parts includes four of the thin film parts.

6. The steering shaft according to claim 1, wherein the inner shaft is a hollow member.

7. The steering shaft according to claim 1, wherein
   the plurality of first tooth parts include thick teeth and thin teeth the width of each of which in the circumferential direction is smaller than the width of each of the thick teeth in the circumferential direction, and
   each of the thin film parts contacts both one of the thick teeth and one of the second tooth parts.

8. The steering shaft according to claim 1, wherein
   the plurality of second tooth parts include thick teeth and thin teeth the width of each of which in the circumferential direction is smaller than the width of each of the thick teeth in the circumferential direction, and
   each of the thin film parts contacts both one of the thick teeth and one of the first tooth parts.

9. A steering-shaft manufacturing method comprising:
   a resin layer formation process of forming a resin layer on an inner shaft or an outer shaft, the inner shaft including a plurality of first tooth parts arranged in a circumferential direction on an outer peripheral surface of the inner shaft, the outer shaft including a plurality of second tooth parts and disposed on an outer peripheral side of the first tooth parts of the inner shaft, the second tooth parts being arranged in the circumferential direction on an inner peripheral surface of the outer shaft;
   a heating process of heating the inner shaft, the outer shaft, and the resin layer in a state in which the resin layer contacts tooth surfaces of all of the first tooth parts and tooth surfaces of all of the second tooth parts; and
   a cooling process of cooling the inner shaft, the outer shaft, and the resin layer after the heating process, wherein
   the plurality of first tooth parts include thick teeth and thin teeth,
   the width of each of the thin teeth in the circumferential direction is smaller than the width of each of the thick teeth in the circumferential direction, and
   the plurality of second tooth parts have a same width in the circumferential direction.

10. A steering-shaft manufacturing method comprising:
   a resin layer formation process of forming a resin layer on an inner shaft or an outer shaft, the inner shaft including a plurality of first tooth parts arranged in a circumferential direction on an outer peripheral surface of the inner shaft, the outer shaft including a plurality of second tooth parts and disposed on an outer peripheral side of the first tooth parts of the inner shaft, the second tooth parts being arranged in the circumferential direction on an inner peripheral surface of the outer shaft;
   a heating process of heating the inner shaft, the outer shaft, and the resin layer in a state in which the resin layer contacts tooth surfaces of all of the first tooth parts and tooth surfaces of all of the second tooth parts; and
   a cooling process of cooling the inner shaft, the outer shaft, and the resin layer after the heating process, wherein
   the plurality of second tooth parts include thick teeth and thin teeth,
   the width of each of the thin teeth in the circumferential direction is smaller than the width of each of the thick teeth in the circumferential direction, and
   the plurality of first tooth parts have a same width in the circumferential direction.

* * * * *